(12) United States Patent
Pabón et al.

(10) Patent No.: US 12,504,879 B2
(45) Date of Patent: *Dec. 23, 2025

(54) USING MULTIPLE SECURITY PROTOCOLS TO CONTROL ACCESS TO A STORAGE SYSTEM

(71) Applicant: Pure Storage, Inc., Santa Clara, CA (US)

(72) Inventors: Luis Pablo Pabón, Sturbridge, MA (US); Grant William Griffiths, San Francisco, CA (US)

(73) Assignee: Pure Storage, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/754,861

(22) Filed: Jun. 26, 2024

(65) Prior Publication Data

US 2024/0345726 A1 Oct. 17, 2024

Related U.S. Application Data

(63) Continuation of application No. 17/989,962, filed on Nov. 18, 2022, now Pat. No. 12,045,463, which is a continuation of application No. 17/163,006, filed on Jan. 29, 2021, now Pat. No. 11,531,467.

(51) Int. Cl.
*G06F 3/06* (2006.01)
*G06F 9/54* (2006.01)

(52) U.S. Cl.
CPC .......... *G06F 3/0607* (2013.01); *G06F 3/0622* (2013.01); *G06F 3/0644* (2013.01); *G06F 3/067* (2013.01); *G06F 9/541* (2013.01)

(58) Field of Classification Search
None
See application file for complete search history.

(56) References Cited

U.S. PATENT DOCUMENTS

| | | |
|---|---|---|
| 7,111,321 B1 | 9/2006 | Watts, Jr. et al. |
| 7,269,696 B2 | 9/2007 | Muhlestein et al. |
| 7,676,562 B2 | 3/2010 | Reistad et al. |
| 7,783,666 B1 | 8/2010 | Zhuge et al. |
| 8,001,304 B2 | 8/2011 | Yung et al. |
| 8,230,085 B2 | 7/2012 | Roa |
| 8,370,914 B2 | 2/2013 | Dalzell et al. |
| 8,387,124 B2 | 2/2013 | Smetters et al. |
| 8,447,829 B1 | 5/2013 | Geller et al. |
| 8,549,279 B1 * | 10/2013 | Sahasranaman ............ G06Q 20/38215 705/64 |
| 9,270,703 B1 | 2/2016 | Clough et al. |
| 9,762,676 B2 | 9/2017 | Olcese et al. |
| 11,196,680 B1 * | 12/2021 | Caceres ............ H04L 47/70 |
| 12,100,250 B2 * | 9/2024 | Parsadayan ........ G07C 9/00182 |

(Continued)

*Primary Examiner* — Edward J Dudek, Jr.
*Assistant Examiner* — Ralph A Verderamo, III
(74) *Attorney, Agent, or Firm* — ALG Intellectual Property, LLC

(57) ABSTRACT

An example storage system concurrently uses, during a transition state, two different security protocols to control access to resources of the storage system. A first security protocol controls access to the resources of the storage system for a first set of access requests that include a token identifier. A second security protocol controls access to the resources of the storage system for a second set of access requests that do not include a token identifier.

20 Claims, 14 Drawing Sheets

(56) References Cited

U.S. PATENT DOCUMENTS

| | | |
|---|---|---|
| 2005/0228835 A1 | 10/2005 | Roa |
| 2009/0210637 A1 | 8/2009 | Yung et al. |
| 2010/0217930 A1 | 8/2010 | Liguori et al. |
| 2012/0246702 A1 | 9/2012 | Shepler et al. |
| 2015/0281218 A1* | 10/2015 | Bowser ............... H04L 63/0823 726/7 |
| 2017/0310675 A1* | 10/2017 | Kodama ................. G06F 21/41 |
| 2018/0278624 A1* | 9/2018 | Kuperman ............. H04L 9/3271 |
| 2019/0207929 A1* | 7/2019 | Koorapati ........... G06F 11/1469 |
| 2020/0052896 A1 | 2/2020 | Acharya et al. |
| 2020/0110875 A1* | 4/2020 | Streifert ................ G06F 18/214 |
| 2020/0302086 A1 | 9/2020 | Post |
| 2020/0314486 A1* | 10/2020 | Thoresz ............. H04N 21/4825 |
| 2021/0306358 A1* | 9/2021 | Luo ..................... H04L 63/1416 |
| 2022/0239503 A1* | 7/2022 | Mallikarjuna Durga Lokanath .... H04L 9/0891 |
| 2023/0055726 A1 | 2/2023 | Bandyopadhyay et al. |
| 2023/0077424 A1 | 3/2023 | Pablo Pabon et al. |

\* cited by examiner

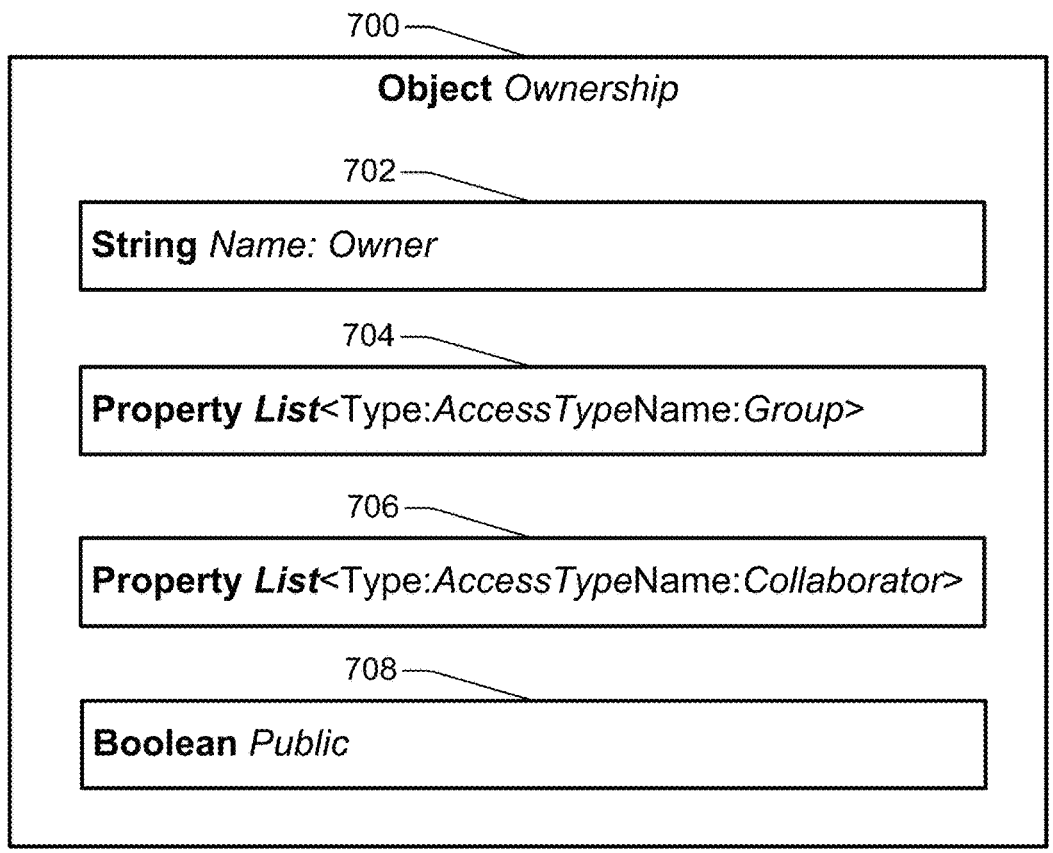
Figure 7A
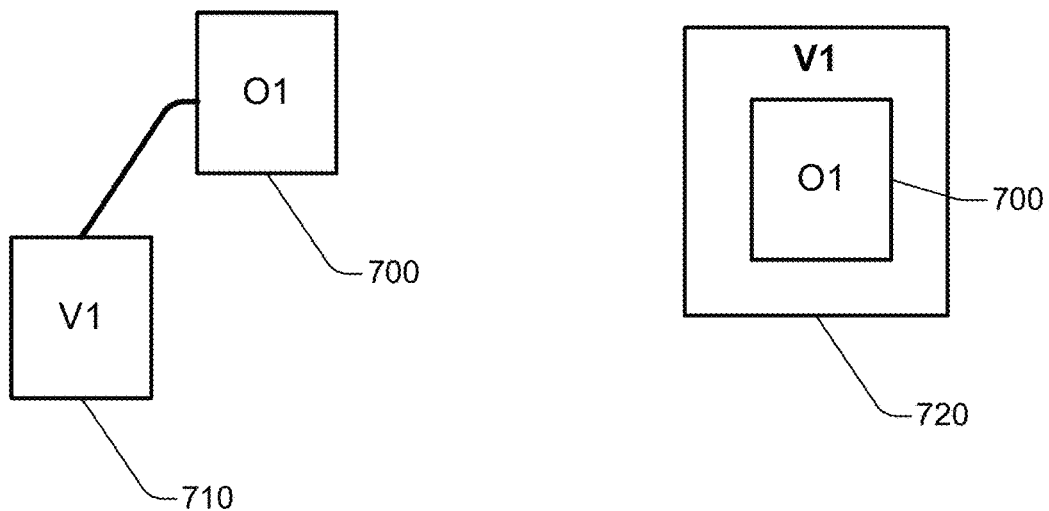
Figure 7B
Figure 7C

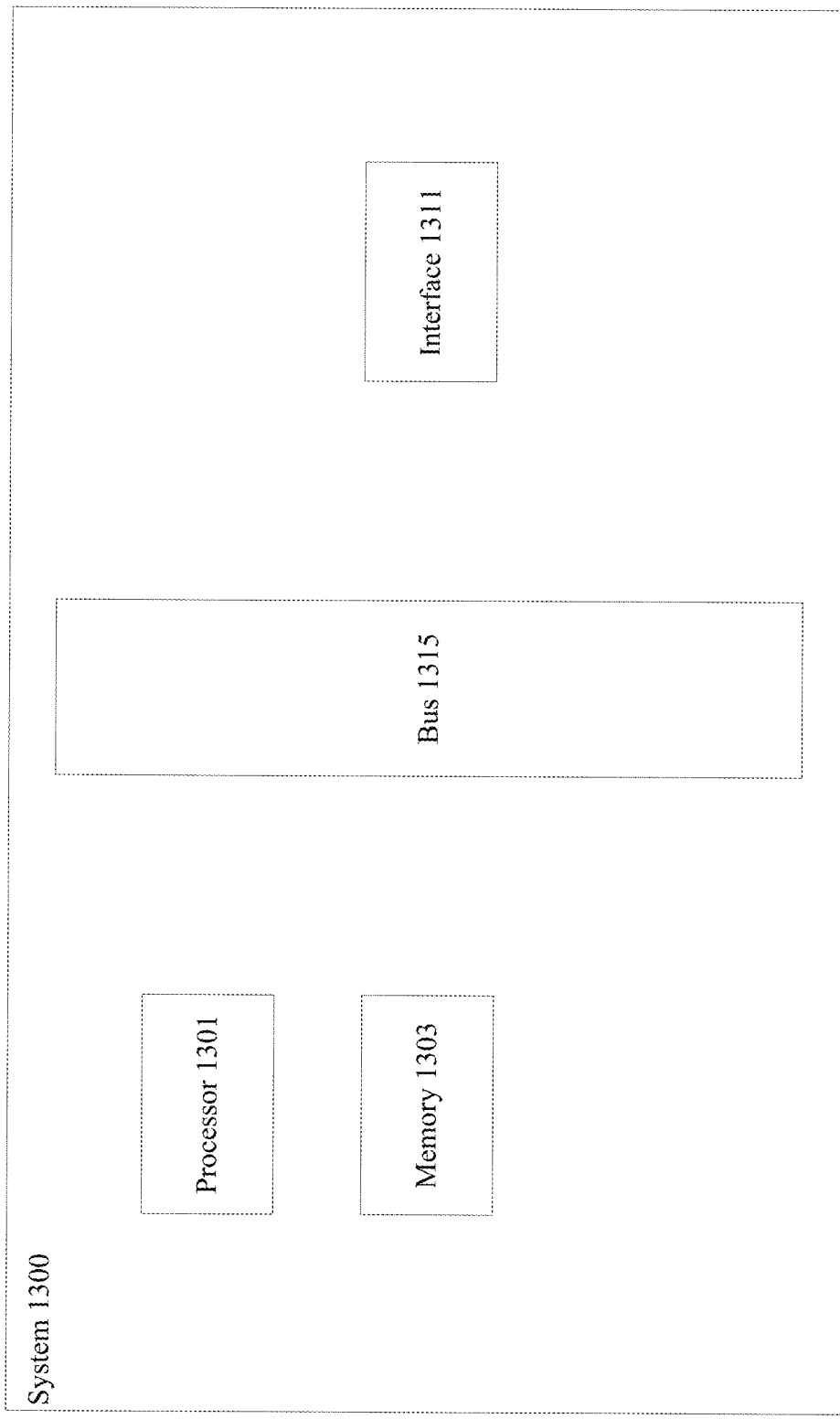

USING MULTIPLE SECURITY PROTOCOLS TO CONTROL ACCESS TO A STORAGE SYSTEM

RELATED APPLICATIONS

This application is a continuation of U.S. patent application Ser. No. 17/989,962, filed Nov. 18, 2022, which is a continuation application of U.S. patent application Ser. No. 17/163,006, filed Jan. 29, 2021, now U.S. Pat. No. 11,531,467, each of which is hereby incorporated by reference in its entirety.

TECHNICAL FIELD

The present disclosure relates generally to digital storage volume management and more specifically to the management of access control of a resource.

DESCRIPTION OF RELATED ART

Cloud-native or network data storage is becoming increasingly prevalent. In computer systems, a storage volume is a fixed amount of storage stored across one or more disks. Storage systems that provide support for multiple users must provide authentication and authorization models to determine who the requestor is. In such systems, once a user is authenticated, there needs to be a model to track access of volumes and other resources in a storage system.

In traditional storage systems, access to volumes was handled at the protocol level, such as Network File System version 4 (NSFv4), Internet Small Computer Systems Interface (iSCSI), or Common Internet File System (CIFS) protocols. However, such protocol level access controls could only manage access to volumes. In addition, most storage systems today do not have their own authentication and authorization protocols. This is because access to storage is usually managed by "gatekeepers," such as orchestration software Kubernetes, which controls and regulates access to storage among multiple users. However, even such gatekeepers have only limited operations. Thus, many users that want a richer set of operations available at the storage level, such as snapshotting, backup, and migration, may want to bypass the gatekeepers, thereby losing volume access management provided by the gatekeepers.

If storage systems want to implement the same access management as the gatekeepers, the storage systems need to be upgraded to secure systems. However, upgrading storage systems from unsecure to secure often requires shutting down the entire system and rebooting the system to implement the security changes. This process is extremely burdensome and costly. In addition, users without identification tokens may lose access to their volumes. Thus, there is a need for way to upgrade a storage system without needing to reboot the entire system while still allowing users without tokens to access their volumes.

SUMMARY

The following presents a simplified summary of the disclosure in order to provide a basic understanding of certain embodiments of the disclosure. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Various embodiments of the present disclosure relate generally to devices, systems, non-transitory computer readable media, and methods for managing access control of resources in a distributed storage system. The method includes first receiving a request, from a user, to access a volume. Then, the request is checked, via an authentication module, for whether the request includes a valid token ID. If the request does not include a valid token ID, a user info object with a role of "guest" is created and assigned to the user. Next, an authorization module determines whether the role of guest is allowed to access the volume in the manner presented in the request. If the request passes the authorization module, then it is determined whether the volume is owned or public. If the volume is owned, access to the volume is given for the guest role only if the volume is specified by the owner to give public access. Otherwise, the request is denied. If the volume is public, access to the volume is given only if the role of guest is allowed to access the volume in the manner presented in the request. Otherwise, the request is denied. If the request does not pass the authorization module, the request to access the volume is denied.

In some embodiments, the volume has an owner, the volume includes an ownership object that identifies the owner. In some embodiments, the ownership object includes a public Boolean to display if the volume is public or not. In some embodiments, if the volume is public, any user can access, mutate, or delete the volume. In some embodiments, the role of public can be changed by an administrator through API management to give or remove certain access rights, including creating public volumes. In some embodiments, if the request is to create the volume, the guest Boolean is set to true, and the request passes the authorization module, then the volume is created without an owner and the volume is specified as public. In some embodiments, a volume is considered public if the volume is not owned.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments.

FIGS. 7A-7C illustrate an example of an ownership object, provided in accordance with one or more embodiments.

FIG. 13 illustrates an example of a computer system, configured in accordance with one or more embodiments.

DESCRIPTION OF EXAMPLE EMBODIMENTS

Figure 1:
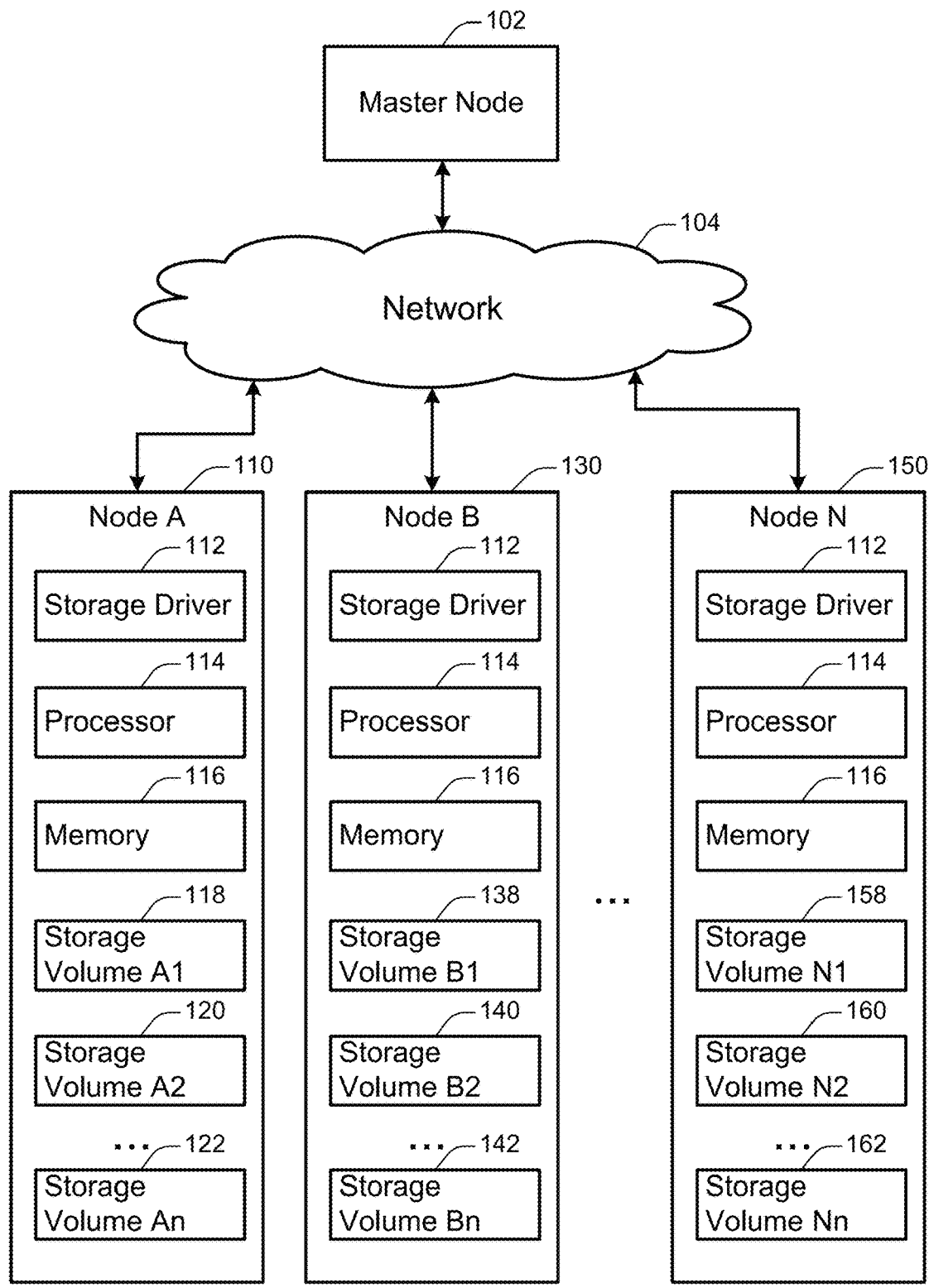
FIG. 1 illustrates an example of a configuration of nodes, provided in accordance with one or more embodiments.

Reference will now be made in detail to some specific examples of the disclosure including the best modes contemplated by the inventors for carrying out the disclosure. Examples of these specific embodiments are illustrated in the accompanying drawings. While the disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

For example, the techniques of the present disclosure will be described in the context of particular containerized storage environments. However, it should be noted that the techniques of the present disclosure apply to a wide variety of different containerized storage environments. In the following description, numerous specific details are set forth in order to provide a thorough understanding of the present disclosure. Particular example embodiments of the present disclosure may be implemented without some or all of these specific details. In other instances, well known process operations have not been described in detail in order not to unnecessarily obscure the present disclosure.

Various techniques and mechanisms of the present disclosure will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present disclosure unless otherwise noted. Furthermore, the techniques and mechanisms of the present disclosure will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Distributed storage, such as cloud-native or network data storage, is becoming increasingly prevalent. When dealing with multiple users, authentication and authorization becomes necessary for determining the identity of a requestor for access to data. Once a user is authenticated, there needs to be a model to track access of volumes and other resources in a storage system. In addition, the user may want to manage other users' access control of resources.

Traditional storage systems have used protocol level access control models. However, such protocol level access control has limited functionality. If users want security with higher functionality, they would normally need to go through gatekeeper software to manage access control to resources. However, even gatekeeper software is limited in operations. If the users want to utilize more advanced functions, like snapshotting, cloud backup, and volume migration, the users have to go directly to the storage systems. However, in order to support multiple users, the storage systems need to be secure, to prevent other users from accessing and manipulating other users' volumes.

Upgrading a distributed storage system from unsecure to secure often requires a system shut down and system reboot. However, system shut down and reboot is costly and highly disruptive to users that rely on the distributed storage system for running their applications. In addition, after the upgrade to secure, existing users that created volumes in the unsecure format may lose access to volumes because those volumes were created under the old regime. Thus, there is a need for upgrading a distributed storage system from unsecure to secure, while still maintaining access to old unsecure volumes in a seamless integration.

According to various embodiments, techniques and mechanisms described herein provide for managing access control of resources in a network based storage system in a more efficient manner. An application programming interface (API) level method of managing access controls to resources is provided. When a first user creates a volume, an ownership object is also created. The ownership object names the first user as the owner and optionally allows the first user to designate a second user, called a collaborator, or a group of users, different access rights to the volume. In some embodiments, a collaborator is a single identifiable non-ownership user. A group is a collective of users that have the same access rights. Any users that are not the owner or that are not designated are not allowed access to the volume.

With the use of ownership objects, access to resources is secure. However, in systems where many volumes were created without ownership objects, non-identified users may still want to access pre-ownership volumes. In such cases, techniques and mechanisms disclosed herein provide for creation of a "guest" role for anonymous, or unidentified, users. Users that do not yet have authentication tokens can therefore still access old volumes that do not have ownership objects associated them. The guest role is managed through the "system.guest" API. Thus, administrators can modify the guest role by adding and removing privileges.

FIG. 1 illustrates an example of a configuration of nodes, provided in accordance with one or more embodiments. According to various embodiments, each node may be configured to read and/or write data on one or more storage volumes. The configuration includes the Master Node 102, the Node A 110, the Node B 130, and the Node N 150. The nodes communicate via a network 104.

According to various embodiments, the network 104 may be a public or private network. For example, the nodes may be located within a particular organization, within a cloud infrastructure, or in some combination thereof.

In particular embodiments, the Master Node 102 may coordinate communication between the different storage nodes. For example, the master Node 102 may transmit instructions to replicate or rebalance storage volumes across storage nodes.

In some embodiments, each node includes a processor 114, a memory module 116, and a storage driver 112. The storage driver may be configured to manage the storage volumes associated with the node.

According to various embodiments, the system may include various numbers of nodes and/or storage volumes. For example, the configuration shown in FIG. 1 includes the storage volumes A1 118, A2 120, An 122, B1 138, B2 140, Bn 142, N1 158, N2 160, and Nn 162. However, other configurations may include different numbers of nodes and storage volumes.

In some implementations, each storage volume may store data associated with one or more applications. Accordingly, by constructing a snapshot of a storage volume, a state associated with an application may be captured and retained.

In particular embodiments, a snapshot corresponds to the entirety of the data associated with a particular storage volume. Alternately, a snapshot may correspond to a portion of the data associated with a particular storage volume. For example, a snapshot may correspond to one or more folders, files, or other units of storage.

Figure 2:
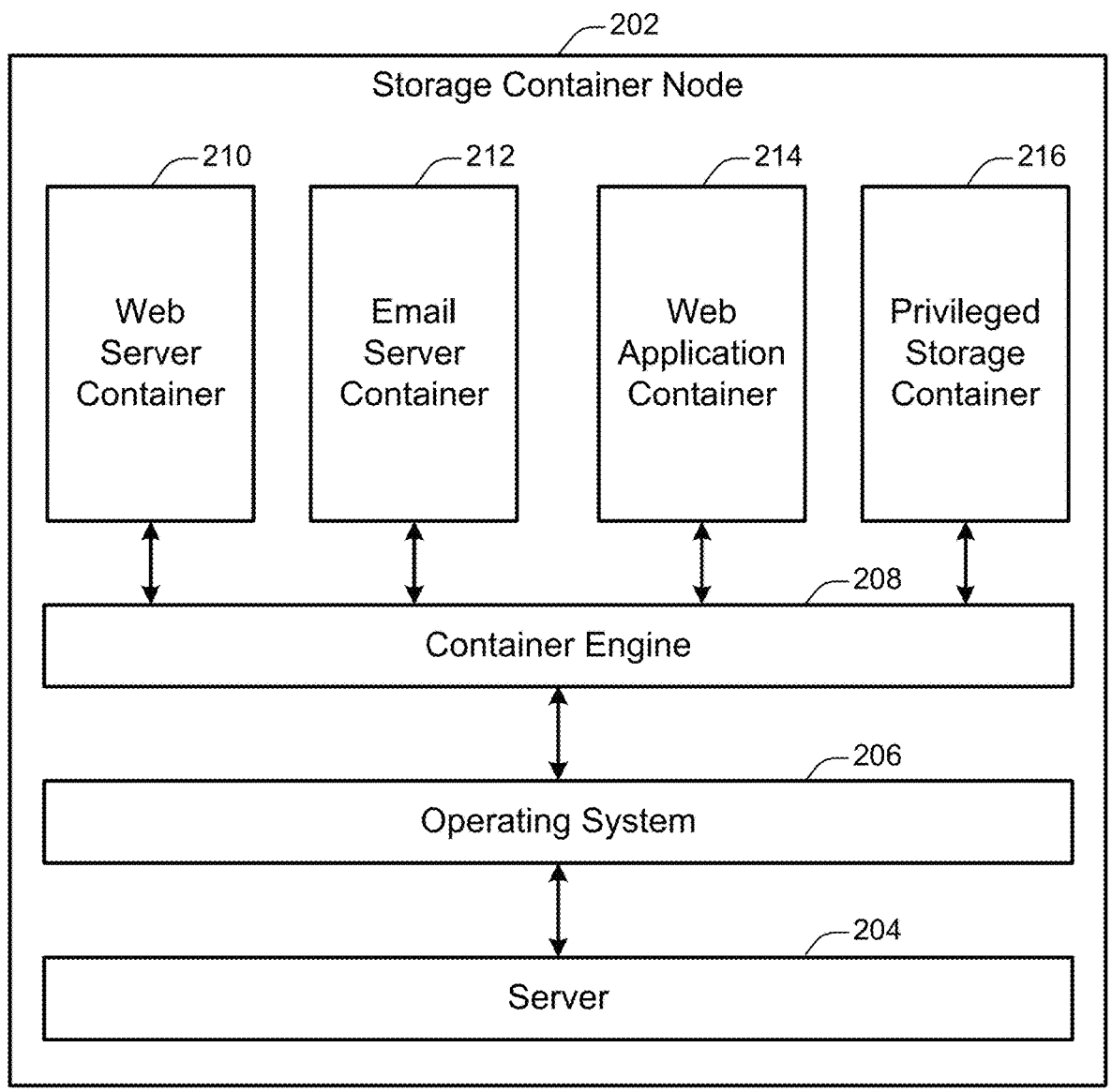
FIG. 2 illustrates an example of a storage container node, configured in accordance with one or more embodiments.

FIG. 2 illustrates an example of a storage container node 202. According to various embodiments, a storage container node may be a server configured to include a container engine and a privileged storage container. The storage container node 202 shown in FIG. 2 includes a server layer 204, an operating system layer 206, a container engine 208, a web server container 210, an email server container 212, a web application container 214, and a privileged storage container 216.

Techniques and mechanisms described herein may facilitate the operation of a scalable storage container node system. In some embodiments, a scalable storage container node system may allow application containers in a virtualized application system to quickly and directly provision and scale storage. Further, the system may be configured to provide one or more user experience guarantees across classes of applications. According to various embodiments, the system may pool the capacity of different services into virtual storage volumes and auto-allocate storage as application storage traffic scales or bursts. For instance, a single virtual storage volume may include hundreds or thousands of terabytes of storage space aggregated across many different storage devices located on many different physical machines.

Techniques and mechanisms described herein facilitate the operation of distributed stateful microservices in conjunction with a distributed, containerized storage system. In a containerized application system based on technology such as Docker or Kubernetes, each compute node implements a container layer that runs in an operating system. The container layer acts as an intermediate layer to facilitate the execution of one or more container applications. The container system is standardized so that a container application may be instantiated on any of various operating systems and on any of various types of hardware.

In some embodiments, storage containers may communicate directly with server resources such as hardware storage devices, thus reducing or eliminating unnecessary virtualization overhead. Storage containers may be configured for implementation in a variety of environments, including both local computing environments and cloud computing environments. In some implementations, storage volumes created according to the techniques and mechanisms described herein may be highly failure-tolerant. For example, a virtual storage volume may include data blocks stored on potentially many different storage nodes. A storage node may fail for any of various reasons, such as hardware failure, network failure, software failure, or server maintenance. Data integrity may be maintained even if one or more nodes that make up a storage volume fail during data storage operations.

According to various embodiments, a storage system with components located across different computing devices is referred to herein as a "distributed storage system." Alternately, or additionally, such a storage system may be referred to herein as a "clustered storage system."

In some embodiments, the storage container node 202 may serve as an interface between storage resources available at a server instance and one or more virtual storage volumes that span more than one physical and/or virtual server. For example, the storage container node 202 may be implemented on a server that has access to a storage device. At the same time, a different storage container node may be implemented on a different server that has access to a different storage device. The two storage nodes may communicate to aggregate the physical capacity of the different storage devices into a single virtual storage volume. The single virtual storage volume may then be accessed and addressed as a unit by applications running on the two storage nodes or at on another system.

In some embodiments, the storage container node 202 may serve as an interface between storage resources available at a server instance and one or more virtual storage volumes that are replicated across more than one physical and/or virtual server. For example, the storage container node 202 may be implemented on a server that has access to a storage volume implemented on one or more storage devices. At the same time, a different storage container node may be implemented on a different server that has access to the same storage volume. The two storage nodes may then each access data stored on the same storage volume. Additional details regarding the configuration of multiple storage container nodes in the same system are discussed with respect to FIG. 3.

At 204, the server layer is shown. According to various embodiments, the server layer may function as an interface by which the operating system 206 interacts with the server on which the storage container node 202 is implemented. A storage container node may be implemented on a virtual or physical server. The server may include hardware such as networking components, memory, physical storage devices, and other such infrastructure. The operating system layer 206 may communicate with these devices through a standardized interface provided by the server layer 204.

At 206, the operating system layer is shown. According to various embodiments, different computing environments may employ different operating system layers. For instance, a physical or virtual server environment may include an operating system based on Microsoft Windows, Linux, or Apple's OS X. The operating system layer 206 may provide, among other functionality, a standardized interface for communicating with the server layer 204.

At 208, a container engine layer is shown. According to various embodiments, the container layer may provide a common set of interfaces for implementing container applications. For example, the container layer may provide application programming interfaces (APIs) for tasks related to storage, networking, resource management, or other such computing tasks. The container layer may abstract these computing tasks from the operating system. A container engine may also be referred to as a hypervisor, a virtualization layer, or an operating-system-virtualization layer.

In some implementations, the separation of the computing environment into a server layer 204, an operating system layer 206, and a container engine layer 208 may facilitate greater interoperability between software applications and greater flexibility in configuring computing environments. For example, the same software container may be used in different computing environments, such as computing environments configured with different operating systems on different physical or virtual servers.

At storage container node may include one or more software containers. For example, the storage container node 202 includes the web server container 210, the email server container 212, and the web application container 214. A software container may include customized computer code configured to perform any of various tasks. For instance, the web server container 210 may provide files such as webpages to client machines upon request. The email server 212 may handle the receipt and transmission of emails as well as requests by client devices to access those emails. The web application container 214 may be configured to execute any type of web application, such as an instant messaging service, an online auction, a wiki, or a webmail service. Although that storage container node 202 shown in FIG. 2 includes three software containers, other storage container nodes may include various numbers and types of software containers.

At 216, a privileged storage container is shown. According to various embodiments, the privileged storage container may be configured to facilitate communications with other storage container nodes to provide one or more virtual storage volumes. A virtual storage volume may serve as a resource for storing or retrieving data. The virtual storage volume may be accessed by any of the software containers 210, 212, and 214 or other software containers located in different computing environments. For example, a software container may transmit a storage request to the container engine 208 via a standardized interface. The container engine 208 may transmit the storage request to the privileged storage container 216. The privileged storage container 216 may then communicate with privileged storage containers located on other storage container nodes and/or may communicate with hardware resources located at the storage container node 202 to execute the request.

In some implementations, one or more software containers may be afforded limited permissions in the computing environment in which they are located. For example, in order to facilitate a containerized software environment, the software containers 210, 212, and 214 may be restricted to communicating directly only with the container engine 208 via a standardized interface. The container engine 208 may then be responsible for relaying communications as necessary to other software containers and/or the operating system layer 206.

In some implementations, the privileged storage container 216 may be afforded additional privileges beyond those afforded to ordinary software containers. For example, the privileged storage container 216 may be allowed to communicate directly with the operating system layer 206, the server layer 204, and/or one or more physical hardware components such as physical storage devices. Providing the storage container 216 with expanded privileges may facilitate efficient storage operations such as storing, retrieving, and indexing data.

Figure 3:
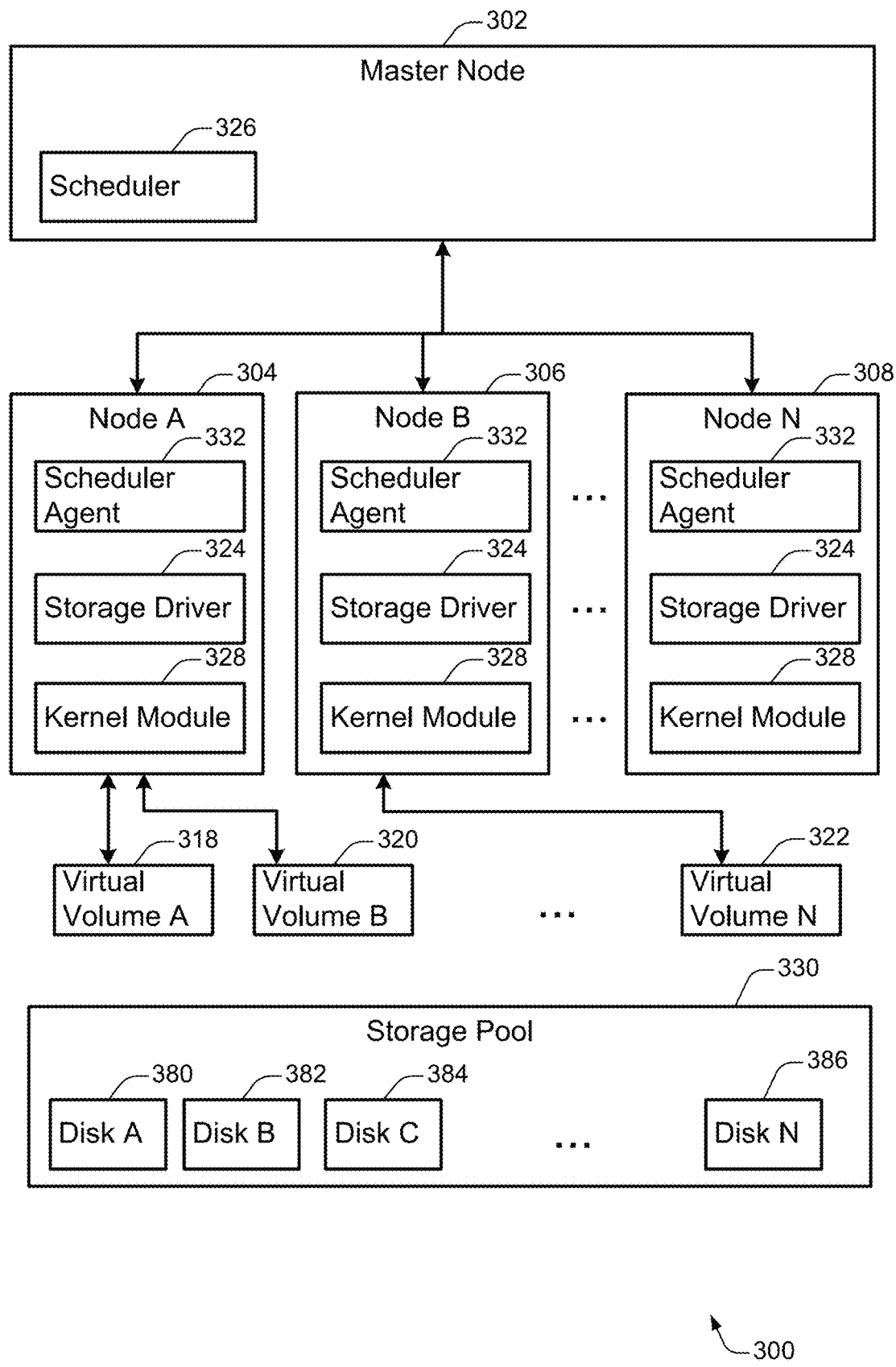
FIG. 3 illustrates an example of an arrangement of components in a containerized storage system, configured in accordance with one or more embodiments.

FIG. 3 illustrates an example of an arrangement of components in a containerized storage system 300, configured in accordance with one or more embodiments. The storage system 300 includes a master node 302 in communication with a plurality of application nodes 304, 306, and 308. Each node has implemented thereon a storage driver 324, a kernel module 328, and a scheduler agent 332. In addition, the master node includes a scheduler 326. Each node can mount one or more of a plurality of virtual volumes 318, 320, and 322. Each virtual volume can include storage space on one or more of a plurality of storage disks 380, 382, 384, and 386 in a storage pool 330.

According to various embodiments, the clustered storage system 300 shown in FIG. 3 may be implemented in any of various physical computing contexts. For example, some or all of the components shown in FIG. 3 may be implemented in a cloud computing environment such as Amazon Web Services (AWS), Microsoft Azure, or Google Cloud. As another example, some or all of the components shown in FIG. 3 may be implemented in a local computing environment such as on nodes in communication via a local area network (LAN) or other privately managed network.

In some implementations, a node is an instance of a container system implemented on a computing device such as the computing device shown in FIG. 11. In some configurations, multiple nodes may be implemented on the same physical computing device. Alternately, a computing device may contain a single node.

According to various embodiments, each node may be configured to instantiate and execute one or more containerized application instance. Each node may include many components not shown in FIG. 3. These components may include hardware components and/or software components, such as those discussed with respect to FIG. 2.

According to various embodiments, each node may include a storage driver 324. The storage driver 324 may perform any of various types of storage-related operations for the node. For example, the storage driver 324 may facilitate the mounting or unmounting of virtual storage volumes. As another example, the storage driver 324 may facilitate data storage or retrieval requests associated with a mounted virtual storage volume.

In some embodiments, each node may include a kernel module 328. The kernel module may receive from the storage driver a request to unmount a virtual volume. The kernel module may then identify a number of references to the virtual volume. Such a reference may be referred to herein as a block device reference. Each reference may reflect an open file handle or other such interaction between the file system and the virtual volume. If the reference count is zero, then the kernel module may unmount the virtual volume and return a message indicating success. If instead the reference count is positive, then the kernel module may return a message indicating failure.

According to various embodiments, each node may include a scheduler agent 332. The scheduler agent 332 may facilitate communications between nodes. For example, the scheduler 326 in the master node may communicate with the scheduler agent 332. The scheduler agent 332 may then communicate with the storage driver 324 to perform an operation such as unmounting a virtual volume.

In some implementations, the disks 380, 382, 384, and 386 may be accessible to the container nodes via a network. For example, the disks may be located in storage arrays containing potentially many different disks. In such a configuration, which is common in cloud storage environments, each disk may be accessible for potentially many nodes to access. A storage pool such as the pool 330 may include potentially many different disks.

According to various embodiments, the virtual storage volumes 318, 320, and 322 are logical storage units created by the distributed storage system, of which the kernel modules and storage drivers are a part. Each virtual storage volume may be implemented on a single disk or may span potentially many different physical disks. At the same time, data from potentially many different virtual volumes may be stored on a single disk. In this way, a virtual storage volume may be created that is potentially much larger than any available physical disk. At the same time, a virtual storage volume may be created in such a way as to be robust to the failure of any individual physical disk. Further, the virtual storage volume may be created in such a way as to allow rapid and simultaneous read access by different nodes. Thus, a single virtual storage volume may support the operation of containerized applications implemented in a distributed fashion across potentially many different nodes.

In some embodiments, the master node 302 is configured to manage the operations of the clustered storage system. For example, the scheduler 326 at the master node 302 may be configured to receive a request to mount a virtual volume for use at a particular node. The scheduler 326 may then communicate with that node to provide instructions to mount the virtual volume.

Figure 4:
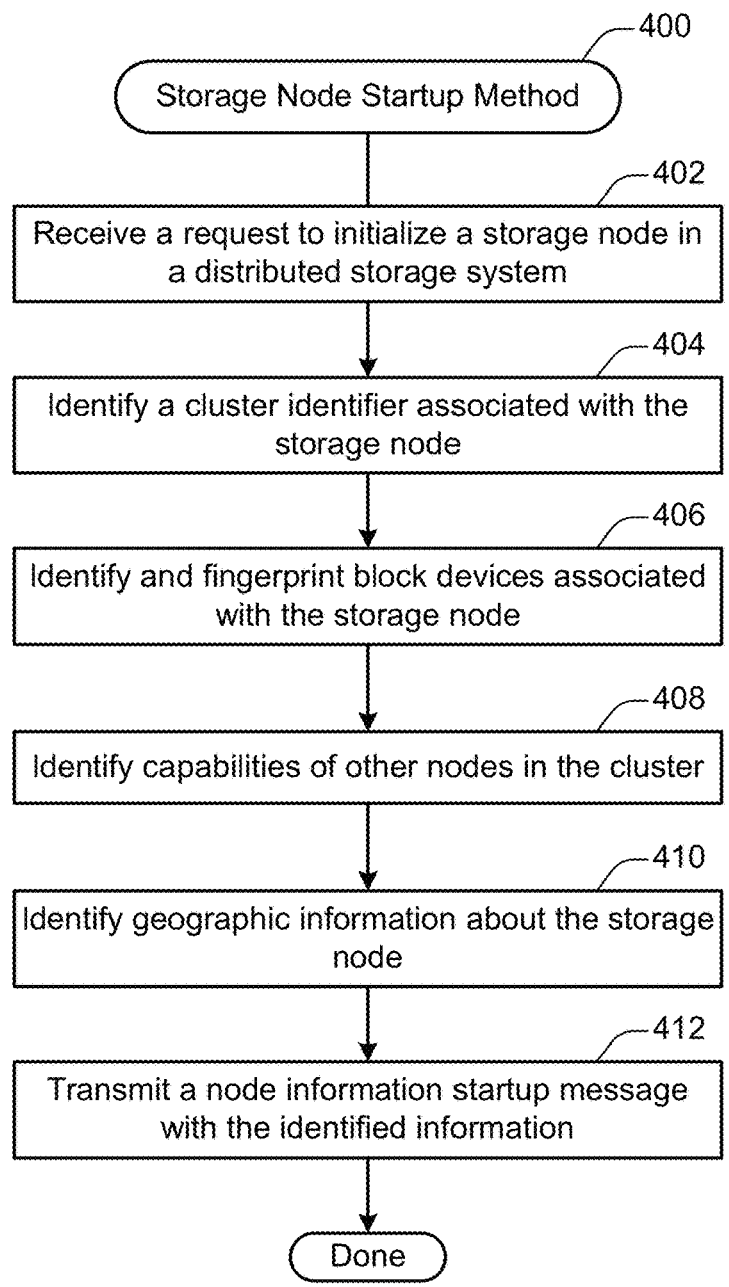
FIG. 4 illustrates a flow chart of an example of a method for starting up a storage node, performed in accordance with one or more embodiments.

FIG. 4 illustrates a flow chart of an example of a method for starting up a storage node. Accordingly, a method, such as method 400, may be implemented to initialize a storage node when that node joins a cluster and becomes available to implement data storage operations. As will be discussed in greater detail below, such an initialization process may include the identification of data associated with various other nodes in the cluster, and such data may be used to generate a cluster hierarchy.

At 402, a request to initialize a storage node in a distributed storage system may be received. According to various embodiments, the request to initialize a new storage container node may be generated when a storage container node is activated. For instance, an administrator or configuration program may install a storage container on a server instance that includes a container engine to create a new storage container node. In various embodiments, the storage node may be included in a distributed storage system. In one example, the distributed storage system may implement storage nodes in clusters. Accordingly, the administrator or configuration program may provide a cluster identifier indicating a cluster to which the storage container node should be added. The storage container node may then communicate with the discovery service to complete the initialization.

At 404, a cluster identifier associated with the storage node may be identified. According to various embodiments, as similarly discussed above, the cluster identifier may be included with the received request. Alternately, or additionally, a cluster identifier may be identified in another way, such as by consulting a configuration file. Accordingly, the cluster identifier may be identified and retrieved based on the request, a configuration file, or from any other suitable source.

At 406, block devices associated with the storage node may be identified. In various embodiments, the block devices may be devices used to store storage volumes in a storage node. Accordingly, a particular storage node may be associated with several block devices. In various embodiments, the block devices associated with the storage node being initialized may be identified based on an input provided by the administrator, or based on a configuration file. In one example, such a configuration file may be retrieved from another node in the identified cluster.

Moreover, the identified block devices may be fingerprinted. In various embodiments, the fingerprinting may identify capabilities of various storage devices, such as drives, that may be utilized by the block devices and/or accessible to the storage node. Such storage devices may be solid state drives (SSDs), solid state hybrid drives (SSHDs), or hard disk drives (HDDs). Types of connections with such storage devices may also be identified. Examples of such connections may be any suitable version of SATA, PATA, USB, PCI, or PCIe. In some embodiments, an input/output (I/O) speed may be inferred based on the device type and connection type. In this way, it may be determined how many storage devices are available to the storage node, how much available space they have, and what type of storage devices they are, as well as how they are connected.

As discussed above, fingerprinting data may include information about underlying physical devices, such as device capacity, I/O speeds and characteristics, as well as throughput and latency characteristics. In various embodiments, such fingerprinting data may be generated based on benchmarking tools that may be implemented and run dynamically, or may have been run previously, and had results stored in a metadata server. In some embodiments, such fingerprinting data may be retrieved from a location in the cloud environment, such as the metadata server or an API server, and such data may be retrieved during the startup process. In various embodiments, such data may be retrieved from a remote location that may include technical specifications or characteristics of the underlying physical devices which may have been determined by a component manufacturer.

At 408, capabilities of other nodes in the cluster may be identified. As discussed above, such capabilities of the other nodes may identify how many storage devices are available to those storage nodes, how much available space they have, and what type of storage devices they are, as well as how they are connected. In various embodiments, capabilities of the other nodes may be one or more performance characteristics, such as I/O capabilities and speeds. Such capabilities may be determined based on devices types of underlying physical devices. For example, a particular type of device may be identified, such as a SSDs, and a particular I/O speed may be identified based on the identified device type. As discussed above, capabilities may also be other characteristics of the nodes, such as a storage capacity of the node, which may be determined based on available storage in one or more underlying physical devices. It will be appreciated that storage capacity may refer to total and/or free capacity of a particular storage node, a particular storage device, and/or a particular storage volume. In various embodiments, such capabilities may be determined based on data included in a configuration file which may be propagated among nodes in the cluster.

At 410, geographic information about the storage node may be identified. In various embodiments, the geographic information may be particular geographical characteristics of a physical location of the storage node. For example, such geographic information may include a first identifier that identifies a rack, or other physical device unit, in which the storage node is located. The geographic information may also include a second identifier that identifies a zone, which may be a particular data center. The geographic information may further include a third identifier that identifies a region or geographical area in which the storage node is located. In various embodiments, such geographic information may be stored at each node, and may be determined based on a query issued to a metadata server. Accordingly, the query to the metadata server may be used by the metadata server to determine geographic information, and such geographic information may be provided to the storage node where it is maintained. In some embodiments, a scheduler may be implemented to maintain such geographic information. In various embodiments, geographic regions may be defined by an entity, such as an administrator, or based upon one or more designated regions, such as a time zone or other designated region such as "Eastern U.S.". While examples of a first, second, and third identifier have been described, any suitable number of identifiers may be used.

At 412, a node information startup message may be transmitted. In various embodiments, the node information startup message may include the identified information. Accordingly, the previously described information may be included in a message and may be transmitted to one or more other nodes in the cluster. In this way, the information associated with the storage node that has been initialized may be propagated to other nodes within the cluster.

Figure 5:
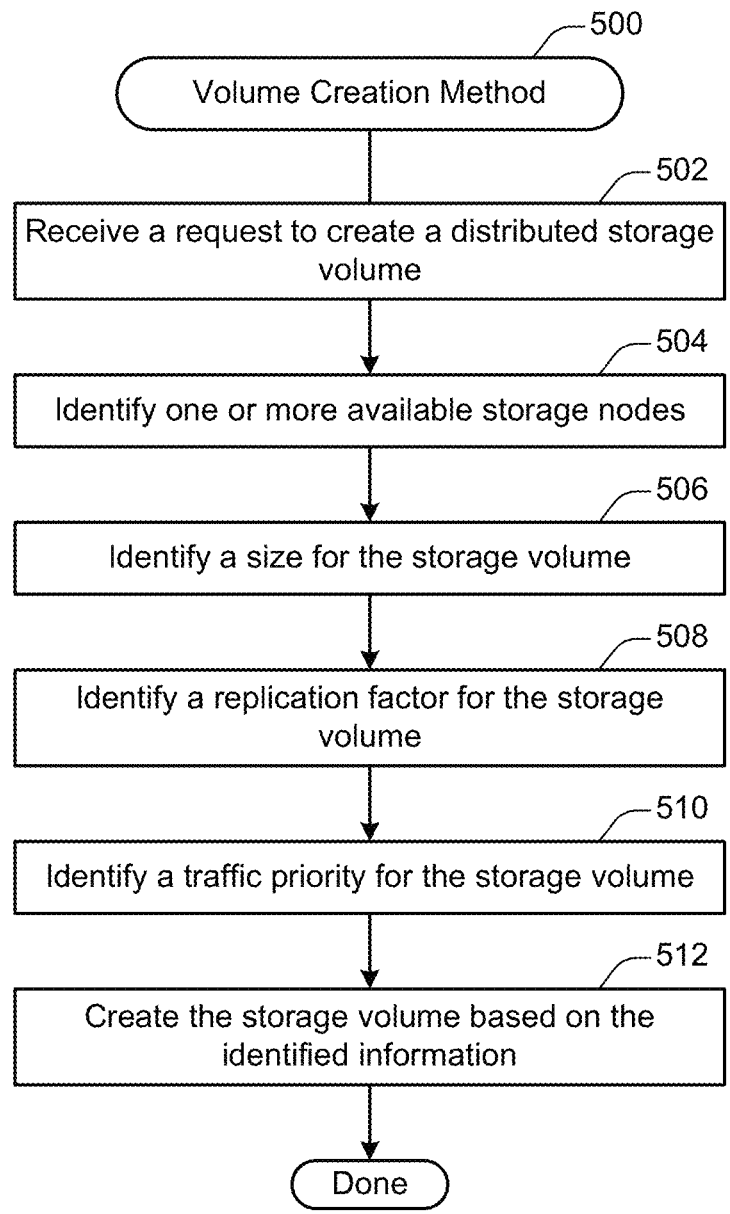
FIG. 5 illustrates a flow chart of an example of a method for creating a storage volume, performed in accordance with one or more embodiments.

FIG. 5 illustrates a flow chart of an example of a method for creating a storage volume. Accordingly, a method, such as method 500, may be implemented to create a storage volume that may be implemented on a storage node. As will be discussed in greater detail below, the creation of the storage volume may include the identification of various features of the storage volume, and such features may be related to or dependent on a particular type of application that is utilizing the storage volume.

At 502, a request to create a distributed storage volume may be received. In various embodiments, the request may be received from an entity or application. For example, the request may be received from an application that is implemented on a particular node. Such a request may be received responsive to the application indicating a storage volume should be created to facilitate execution and implementation of the application or one of its features. In a specific example, the application may be a database or distributed storage application that is configured to implement multiple storage volumes. Accordingly, such an application may issue a request to implement a storage volume to support database functionalities.

At 504, one or more available storage nodes may be identified. In various embodiments, such available storage nodes may be identified based on one or more characteristics of the storage nodes. For example, the storage nodes may have status identifiers which may indicate whether or not a particular storage node is available to implement additional storage volumes, or unavailable and not able to implement additional storage volumes. Such status identifiers may be stored and maintained in a configuration file, and may be propagated among nodes in the cluster. Accordingly, at 504, available storage nodes may be identified based on status identifiers.

At 506, a size for the storage volume may be identified. In various embodiments, the size of the storage volume may be identified based on the request received at 502. For example, the request may include various characteristics of the storage volume to be implemented, such as its size, and such characteristics may have been determined by the application that issued the request. Accordingly, at 506, a size of the storage volume may be identified based on information that was included in the request.

At 508, a replication factor for the storage volume may be identified. In some embodiments, a replication factor may identify a number of storage nodes and/or storage volumes data is to be replicated to within a particular cluster. According to various embodiments, the replication factor may be identified based on the request received at 502. For example, the request may include an indication of a replication factor to be implemented. In another example, the replication factor may be assigned based on a designated value that may be have been determined by an entity, such as an administrator.

At 510, a traffic priority for the storage volume may be identified. In various embodiments, a traffic priority may be a priority or hierarchy that determines and prioritizes which traffic is allocated to available hardware and network resources in which order. Accordingly, a traffic priority may be determined for the storage volume based on one or more characteristics of the storage volume, an application that may be associated with the storage volume, and data that may be associated with the storage volume. For example, a storage volume may be assigned a higher traffic priority if the data being stored in the storage volume is considered to be "dynamic" data that is expected to be read and written frequently, as may be determined based on information included in the request received at 502.

In one specific example, the storage volume may be associated with MySQL data that will be frequently read and re-written to accommodate database operations. In this example, such a storage volume should have low latency I/O characteristics of underlying devices, and would be assigned a high traffic priority. In another example, volumes implemented for streaming purposes also should have low latencies, and may also be assigned high traffic priorities. Additional examples may include volumes implemented using Apache Cassandra or Hadoop, which should have high throughput characteristics of underlying devices, and would also be assigned a high traffic priority. In another example, a storage volume may store backup data that is written once and rarely retrieved. Such a storage volume may be assigned a low traffic priority. In yet another example, a storage volume may be used to implement a file server, where there may be frequent data accesses, but some additional latency may be tolerable. Such a storage volume may be assigned a medium traffic priority. In various embodiments, traffic priorities may be associated with categories that are determined based on an impact to an end user.

At 512, the storage volume may be created based on the identified information. Therefore, based on the identified information one or more storage volumes may be created. In this way, a storage volume may be created that is implemented on an available node, is consistent with a specified size, has been implemented in accordance with a particular replication factor with other identified available storage nodes, and has been assigned a particular traffic priority. As will be discussed in greater detail below, the utilization and implementation of such storage volumes may be further configured to provide high availability, fast data recovery, balanced I/O burden as well as various other features among storage volumes and their underlying storage nodes.

Figure 6:
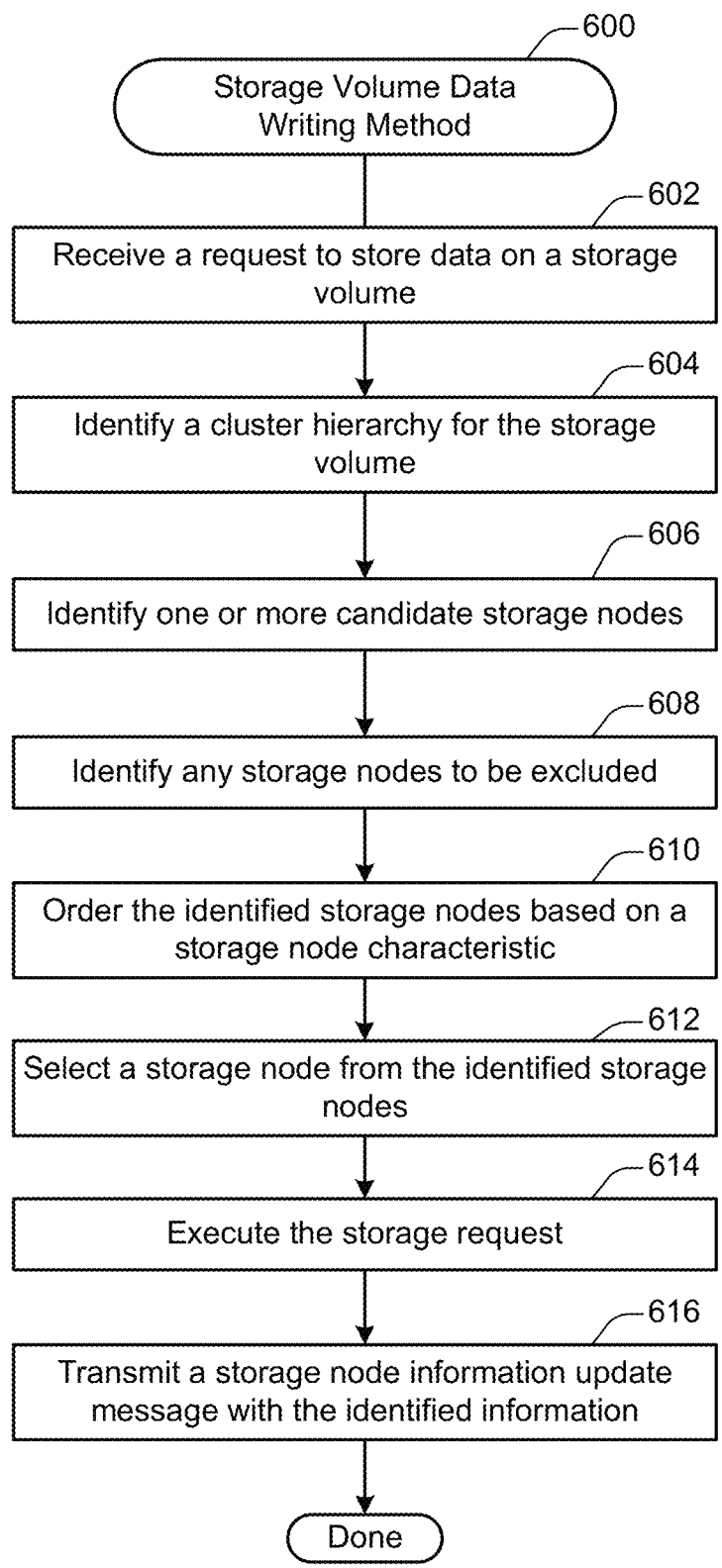
FIG. 6 illustrates a flow chart of an example of a method for writing storage volume data, performed in accordance with one or more embodiments.

FIG. 6 illustrates a flow chart of an example of a method for writing storage volume data. As will be discussed in greater detail below, a method, such as method 600, may implement data storage within one or more clusters of storage nodes while maintaining high availability of the data, fast potential recovery of the data, and balanced I/O burden across the storage nodes of the clusters. Moreover, embodiments disclosed herein may also facilitate the possible implementations of aggregations of storage volumes, as well as various storage volume constraints. In this way, the identification of candidate storage nodes and execution of data storage requests described herein provide improvements in failover tolerance of data, availability of the data, as well as balance in the utilization of storage and network resources.

At 602, a request to store data on a storage volume may be received. In various embodiments, the request may have been generated by an application that has requested to write data to a storage volume that may be implemented on one or more storage nodes. As also discussed above, the storage volume may be implemented as a block device and may be utilized as a storage device for the requesting application. In a specific example, the application may be a database application, and the storage volume may be one of many storage volumes managed by the database application.

At 604, a cluster hierarchy for the storage volume may be identified. In various embodiments, a cluster hierarchy may identify or characterize various features or storage characteristics of the storage nodes within the cluster that is associated with the requesting application. For example, such storage characteristics identified by the cluster hierarchy may be identifiers of storage nodes in the cluster, their current status, their storage capacities, their capabilities, and their geographical features. In various embodiments, such a cluster hierarchy may be retrieved from a particular storage node, as such information may be propagated throughout the cluster. In various embodiments, the cluster hierarchy may characterize or represent the storage nodes based on geographical information, such as region, zone, and rack, and may also include data characterizing capabilities of the nodes, such as total capacity, free capacity, drive type(s), drive speed(s), and types of drive connection(s). In one example, the cluster hierarchy may represent such nodes and geographical information as having a particular structure, such as a "tree". Accordingly, the cluster hierarchy may be stored as a matrix or a network graph that characterizes or represents node-to-node proximity, and is distributed amongst the cluster and globally accessible.

In various embodiments, the cluster hierarchy may further identify physical location information of the storage nodes. For example, the cluster hierarchy may include information that indicates node-to-node proximity on a network graph. In various embodiments, node-to-node proximity may identify whether or not nodes are implemented within the same rack, zone, and/or region. Accordingly, such a network graph may be generated from the perspective of the storage node that initially receives the data storage request, and may identify a node-to-node proximity for all other nodes in the cluster. In various embodiments, such node-to-node proximities may be inferred based on latency information resulting from pings sent to those other nodes. For example, very low latencies may be used to infer that nodes are included in the same rack. Furthermore, existing cluster hierarchies generated by other nodes during their initialization, which may have occurred previously, may be retrieved and used to augment the currently generated cluster hierarchy and/or verify node-to-node proximities of the currently generated cluster hierarchy.

At 606, one or more candidate nodes may be identified. In various embodiments, the candidate nodes may be nodes that may be capable of implementing the storage request consistent with one or more storage parameters. Accordingly, storage parameters may be a set of specified storage characteristics that are features of candidate storage nodes that indicate that they are able to satisfactorily support implementation of the data storage request. More specifically, such candidate storage nodes may be any nodes within a cluster hierarchy that have enough available storage space to execute the storage request, and can also support various other specified characteristics, examples of which may be a desired replicability and latency. As will be discussed in greater detail below, the implementation of such parameters along with additional constraints may be configured to ensure that the execution of the storage request on such candidate nodes is consistent with maintaining high availability of the data, fast potential recovery of the data, balanced I/O burden across the storage nodes of the cluster, possible implementations of aggregations of storage volumes, and one or more storage volume constraints discussed in greater detail below.

As similarly discussed above, the storage parameters, may include specified characteristics. For example, the specified characteristics may identify a specified I/O capability which may have been specified by the requesting application, or may have been determined based on one or more features of the storage volume in which the data is to be stored. In various embodiments, the storage parameters may be compared with the features and characteristics of storage nodes to determine which storage nodes meet the criteria or constraints set forth by the storage parameters. Additional examples of storage parameters may include a geographical location, such as region and rack, a status, and a storage capacity. In a specific example, different regions may be scanned, and candidate storage nodes may be identified for each particular region. Accordingly, different sets of candidate storage nodes may be identified for particular geographical regions.

At 608, one or more nodes may be excluded. In various embodiments, one or more candidate storage nodes may be excluded based on one or more constraints. Such constraints may be specific sets of features or characteristics of the storage nodes, features of the storage volume, or features of the application implemented on the storage node. In various embodiments, the constraints may be included in the data storage request, or may be inferred based on the contents of the request, the features of the storage volume and/or the application associated with the request. Accordingly, the constraints may be storage volume specific constraints, such as whether or not the data storage request is associated with a storage volume that is included in a group of storage volumes, as may be the case with a striped storage volume in which data is striped across a group of storage volumes.

For example, a 100 GB aggregated storage volume may be striped across 10 storage volumes such that each storage volume stores 10 GB of the aggregated storage volume. In this example, the storage volumes may be implemented in the same rack. Accordingly, the constraints may indicate that only storage nodes from that rack should be identified as candidates, and all others should be excluded. Accordingly, such constraints may be configured to implement storage volume specific rules. In various embodiments, the constraints may include various other characteristics, such as application specific replication requirements, and application specific I/O requirements.

Various other constraints may be implemented as well. For example, replication priority may be used to exclude candidate storage nodes. As discussed above, a particular storage node, rack, data center, or region could fail. To protect against such failure, the implementation of replication priority may be guaranteed for a storage volume. In some embodiments, the system may attempt to implement the maximum level of replication priority that a storage node supports. For example, if it is determined that all data needs to be stored on a single rack for fast I/O, then replication of data would not be implemented within the rack, but may be implemented at storage nodes of other racks which may be in other racks, zones, and/or regions. In another example, if it is determined that data needs to be protected against a data center failure, then the data may be split across different zones. In this example, storage nodes utilized for replication of data would exclude storage nodes in the same zone as the storage node that initially receives the data storage request. In this way, various constraints, also referred to herein as data distribution parameters, may be identified based on parameters received and determined during creation of a volume or node, and determined based on I/O patterns, and such constraints may be used to identify nodes that match or meet the constraints. Accordingly, storage nodes that don't meet particular criteria or constraints may be excluded, while storage nodes that do meet the criteria or constraints may be ordered to maximize I/O given those constraints, as will be discussed in greater detail below.

At 610, the identified storage nodes may be ordered based on one or more storage node characteristics. For example, the identified storage nodes may be ordered based on available size. As discussed above, the available size and storage capacity of the storage nodes may have been identified. In various embodiments, the identified candidate storage nodes may be sorted in descending order of available size. In this way, storage nodes with the greatest capacity may be prioritized first, and the storage of data may be balanced among the available storage nodes. In various embodiments, the identified storage nodes may be ordered based on other storage node characteristics as well, such as I/O capabilities. Moreover, the identified candidate storage nodes may be ordered based on combinations of the storage node characteristics.

At 612, one or more storage nodes may be selected from the identified storage nodes. Accordingly, a particular storage node, or several storage nodes, may be selected in accordance with the order set forth at 610, For example, the candidate storage nodes may be ordered at 610, and the first candidate storage node may be selected. In some embodiments, additional storage nodes may be identified to implement one or more other features, such as a replication factor. In another example, a best storage node may be selected from each of several different rack, zones, or regions, and such storage nodes may be used to implement the storage request, as discussed in greater detail below.

At 614, the storage request may be executed. Accordingly, the data included in the storage request may be stored in a storage volume implemented on the identified storage node. Moreover, the data may be replicated to one or more other identified storage nodes in a manner consistent with the previously described order of identified candidate storage nodes as well as a replication factor. For example, if a replication factor indicates that five copies of the data should be stored in other nodes, the data may be stored on an additional five identified candidate nodes as set forth at 610 and 612.

At 616, a storage node information update message may be transmitted. In various embodiments, the storage node information update message may include updated information that identifies the updated features of the storage node at which the storage request was executed. For example, the message may include an updated storage capacity. The message may be sent to the other storage nodes in the cluster thus propagating the information throughout the cluster.

FIGS. 7A-7C illustrate an example of an ownership object, provided in accordance with one or more embodiments. When a first user creates a volume, an ownership object 700 is created. In some embodiments, creating a volume includes creating a volume object. In some embodiments, ownership object 700 is automatically created. In other embodiments, ownership object 700 is created as a separate manual step to creating the volume object 710 or 720. In some embodiments, ownership object 700 is placed inside/embedded in the volume object 720, as shown in FIG. 7B. In some embodiments, a volume object 710 simply contains a reference to an ownership object 700 stored as metadata to volume object 710 in a lookup table or database.

In some embodiments, ownership object 700 includes a string field 702 and one or more property list fields 704 and 706. String field 702 represents and defines the name of the owner. For example, if a user, "U1," created the volume object, then "U1" would be the name stored in string field 702. In some embodiments, string field 702 is automatically filled in with the name in a user token identification (ID). For example, a user who requests to create a volume, has to provide a token ID unique to the user in order to create the volume. Once the volume is created (e.g., storage space allocated and/or a volume object created), an ownership object is also created with the owner being the name provided in the token ID. In some embodiments, the token ID is issued by a token authority, such as Google.com. An example of a token is presented in FIG. 11C.

In some embodiments, ownership object 700 also includes property list field 706. Property list field 706 includes two subfields: an access type and a collaborator name. The collaborator is the name of a user to whom the owner wants to give rights to the resource. If the name of a collaborator is not found in the list, then the collaborator does not have access to the resource. The access type subfield defines what type of access the owner wants to give to another user. In some embodiments, there are three different types of access types: 1) Read, 7) Write, and 8) Admin. In some embodiments, the Read access type allows access to only view or copy the resource. Read access does not allow for effecting or mutating the resource. In other words, in some embodiments, the Read access type only allows a designated user to snapshot the resource. In some embodiments, the Write access type allows Read access plus the permission to change the resource. In some embodiments, the Admin access type allows Write access plus the permission to delete the resource and add group and collaborator access. In other words, Admin access gives basic ownership access rights.

In some embodiments, ownership object 700 also includes property list field 704. Property list field 704 is similar to property list field 706, except that a group can be named instead of an individual collaborator. In some embodiments, a group includes one or more collaborators. If a collaborator is part of a group named in property list field 704, then the collaborator has all access rights of the type listed in property list field 704. If the name of a group is not found in the list, then the group does not have access to the resource.

In some embodiments, the owner has all the rights of an admin by default. In some embodiments, admin rights give more rights than write access, but less rights than owners. For example, in some embodiments, the owner may not want to give deletion rights to admin, but want to give admin the ability to add other groups or collaborators. In such embodiments, the owner would have to specify the access rights of the admin to prevent deletion of the volume.

Figure 8:
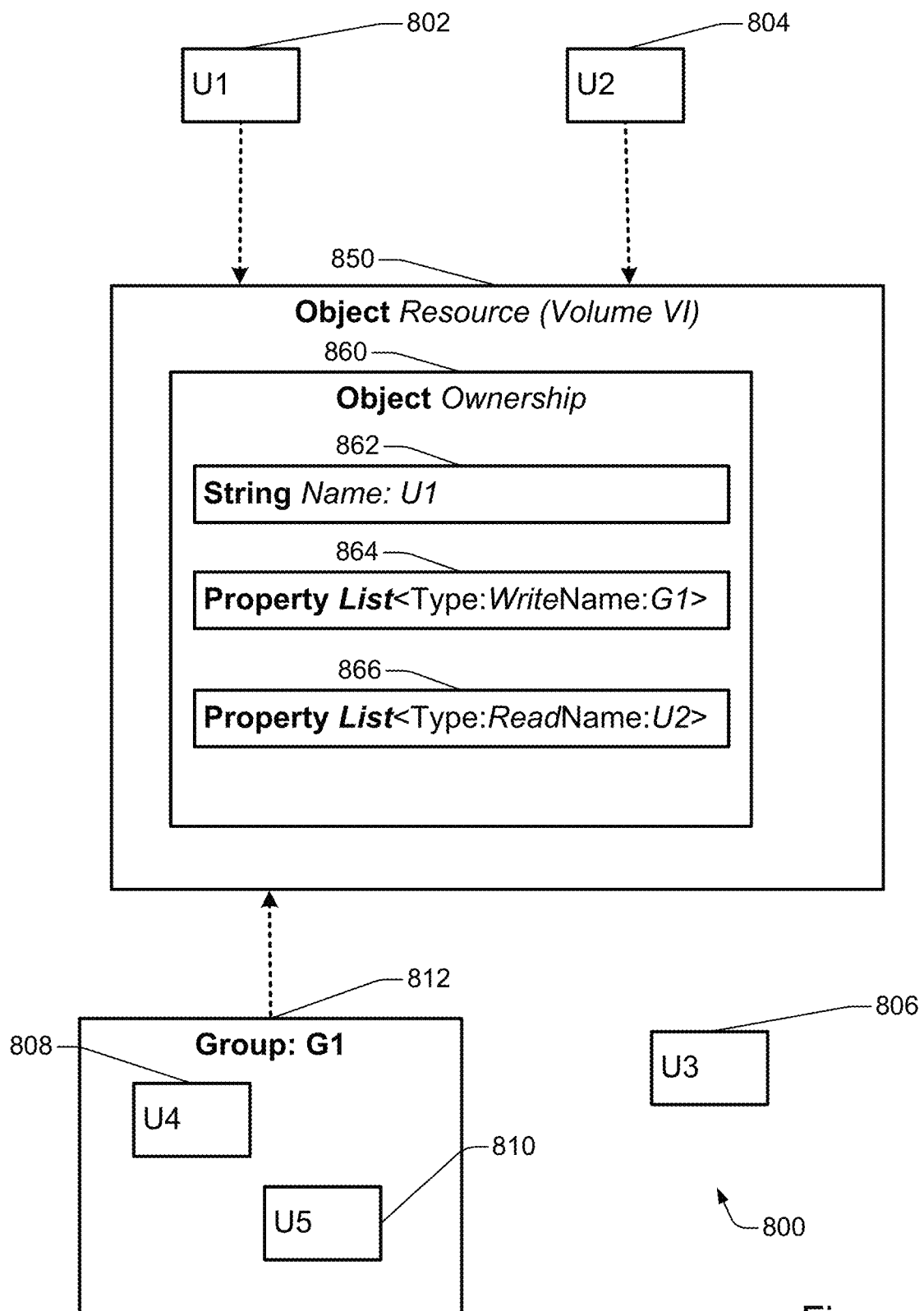
FIG. 8 illustrates an example block diagram illustrating access rights to a volume object, provided in accordance with one or more embodiments.

FIG. 8 illustrates an example block diagram 800 illustrating access rights to a volume object 850, provided in accordance with one or more embodiments. Block diagram 800 illustrates the access rights to users 802, 804, 806, 808, and 810. User 802, named "U1," creates Volume VI, which is represented as volume object 850. Since U1 created Volume VI, ownership object 860 is created with "U1" being stored in string field 862 as the sole creator of volume object 850, i.e., the owner. Owner 802 then provides user 804, named "U2," with Read access to Volume VI. Thus, "U2" is stored as the collaborator subfield in property list field 866, with "Read" as the access type subfield. In some embodiments, U2 is listed as a collaborator when volume VI is first created. In other embodiments, owner 802 explicitly gives collaborator 804 Read access rights at a later time. Next, owner 802 gives group 812, named "G1," Write permission to Volume VI. Group G1 includes user 808, named "U4," and user 810, named "U5." Thus, both users 808 and 810 have Write access to volume V1. The subfields "Write" and "G1" are stored in property list field 864. In some embodiments, user 806, named "U3," may try to access Volume VI. However, since U3 is not named as a collaborator in property list field 866, and since U3 is not part of Group G1, then user 806 is categorically denied access to Volume VI.

Figure 9:
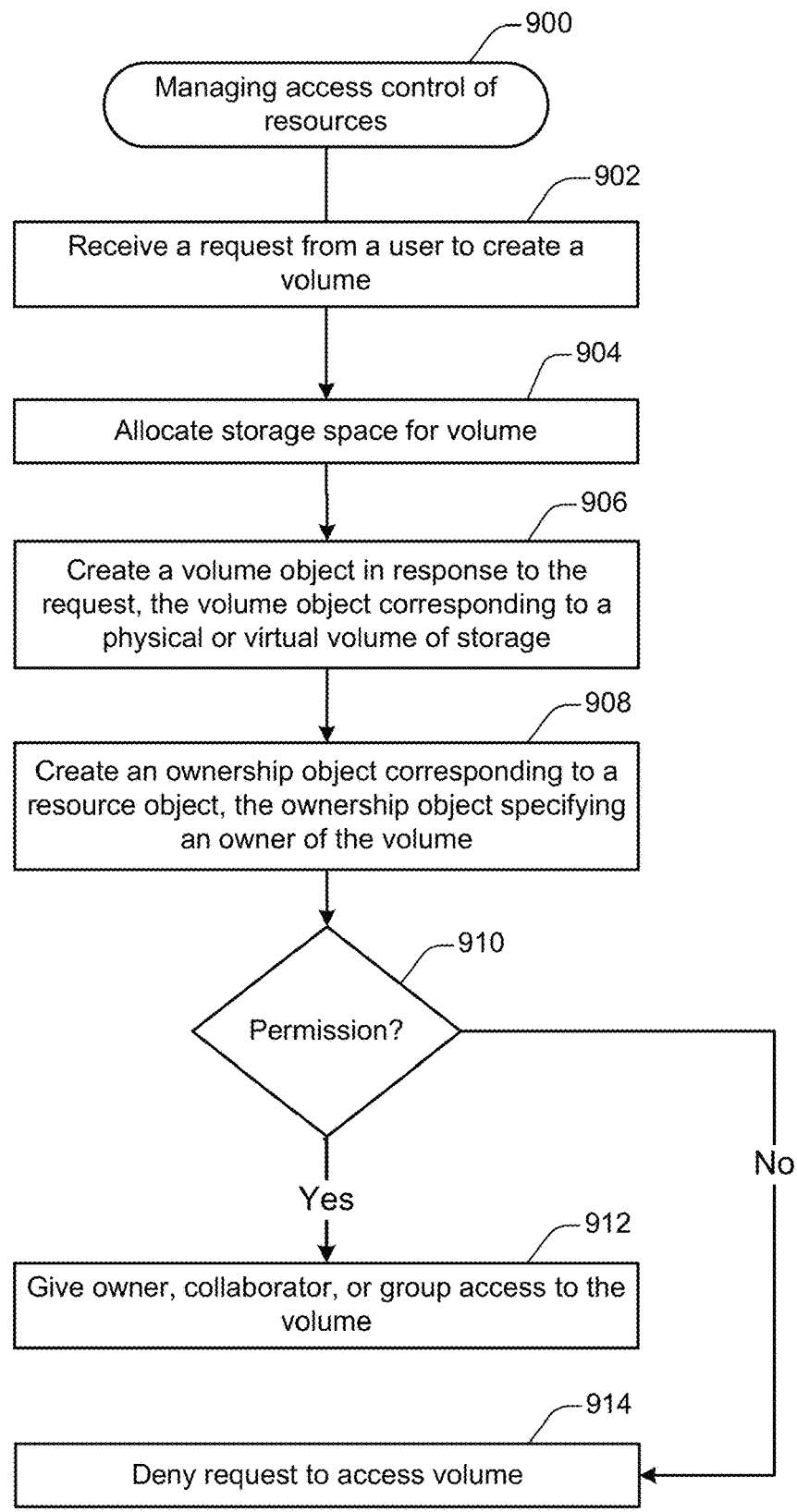
FIG. 9 illustrates an example of a method for managing access control of resources, performed in accordance with one or more embodiments.

FIG. 9 illustrates an example of a method 900 for managing access control of resources, performed in accordance with one or more embodiments. Method 900 may be performed at least in part at a node having one or more storage volumes mounted thereon. In particular embodiments, the method 900 may be performed at least in part at a scheduler, such as the scheduler 326 and/or the scheduler agent 332 shown in FIG. 3.

At 902, method 900 begins with receiving a request from a user to create a volume. In some embodiments, the request includes a token ID that identifies the user. In some embodiments, the token ID includes identification information, e.g., a name, email, an issued at time value (IAT), an expiration date, and/or a subject unique identification number. In some embodiments, the token ID also includes what roles the user has or groups that the user is in.

At 904, storage space is allocated for the volume. In some embodiments, the allocated space is a physical storage space that is allocated based on the volume request. For example, if the request calls for creating a volume of 10 GB, then the system will allocate 10 GB of storage for the volume. In some embodiments, the storage space is a virtual volume. In some embodiments, the system only allocates a portion of the requested volume size in order to comply with a thin provisioning policy. In some embodiments, the request may not include a specific volume size, in which case a default amount of space, e.g., 1 GB, is allocated in storage.

At 906, a volume object is created in response to the request. In some embodiments, the volume object corresponds to a physical or virtual volume of storage, as described above. At 908, an ownership object corresponding to a volume object is created. In some embodiments, the ownership object specifies an owner of the volume. In some embodiments, the ownership object includes a string field corresponding to the name of the owner derived from the token ID.

In some embodiments, the ownership object is embedded within the volume object. In some embodiments, the ownership object data is stored as metadata in a database, such as in a lookup table.

In some embodiments, the owner of the volume has all access rights to the volume. In some embodiments, if the request to create the volume includes providing access to a collaborator or a user group, then the system also gives the collaborator or any member of the user group access rights to the volume. In some embodiments, the ownership object includes one or more property list fields corresponding to collaborators and user groups, each property list field including a name subfield and an access type subfield. In some embodiments, the access type subfield can be a read type, a write type, and an admin type. In some embodiments, an admin type can have all the access rights of an owner. In other embodiments, an admin type can only have a subset of the rights of an owner.

In some embodiments, the original request to create the volume did not identify any collaborators or user groups. However, in some embodiments, the owner of the volume can subsequently send a request to add collaborators or user groups after the volume has already been created. In such embodiments, upon receiving a subsequent request from the owner to add access rights to the volume for a specific collaborator or a user group, the system modifies the ownership object to reflect giving access rights to the specific collaborator or user group.

In some embodiments, after the volume is created, the system may receive a request to access the volume. At 910, the system checks whether the requestor has permission to access the volume. For example, the system checks whether the requestor is the owner, a collaborator, or a member of a user group. If the requestor is the owner, a collaborator, or a member of a user group, then the requestor is given access to the volume in step 912. If the requestor is the owner, then the requestor is allowed to access the volume unconditionally. If the requestor is a collaborator or a member of a user group, then the type of access is checked to see if the requestor is indeed allowed to access the volume is the way requested. For example if the request is to write to the volume, then the access type is reviewed to see if requestor has write access to the volume. If not, then method 900 moves to 914.

If the requestor is not the owner, collaborator, or a member of a user group, then the request to access the volume is denied in step 914.

Figure 10:
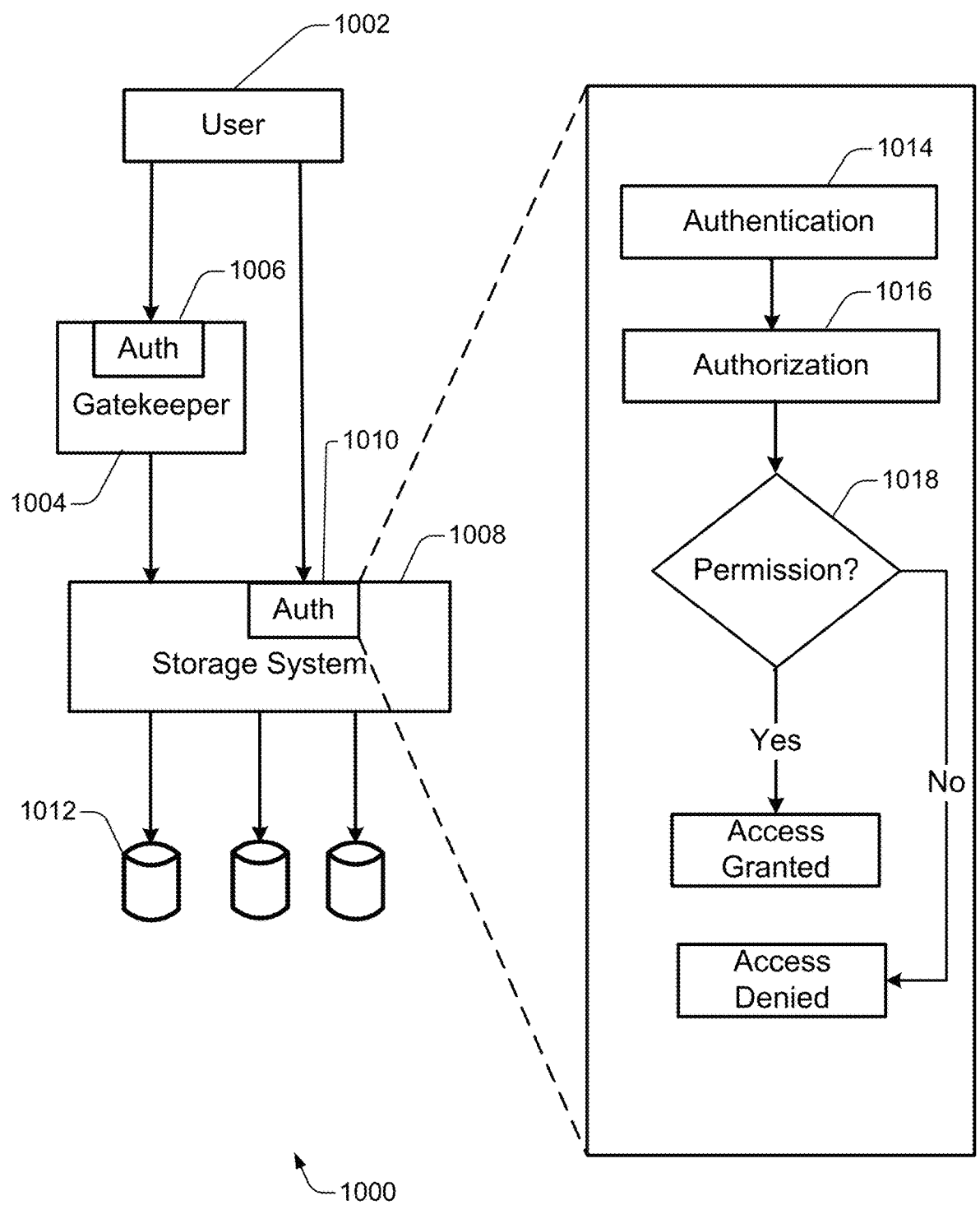
FIG. 10 is a block diagram illustrating an example architecture for implementing resource management, in accordance with one or more embodiments.

FIG. 10 is a block diagram illustrating an example architecture 1000 for implementing resource management, in accordance with one or more embodiments. A user 1002 can access storage system 1008 either via a gatekeeper 1004, such as Kubernetes, or directly with storage system 1008 itself. In some embodiments, gatekeeper 1004 includes authentication/authorization protocol 1006, which allows multiple users to manage access to volumes. When user 1002 accesses storage system 1008 via gatekeeper 1004, storage system 1008 does not need to worry about the wrong user accessing the wrong volume in storage 1012. However, should user 1002 want to access storage system 1008 directly, then storage system 1008 must activate security protocol 1010, which checks for authentication, authorization, and permissions of the requestor. It should be noted that current storage systems do not allow control plane access to users because of security reasons. Thus, security protocol 1010 enables multiple users to access storage system features directly via the control plane without the security concerns.

In some embodiments, security protocol 1010 includes an authentication module 1014 configured to determine whether the requestor is indeed who he says he is. In some embodiments, this includes first retrieving the token authority that issued the token ID included in an access request. For example, the issuer can be "Google.com." In some embodiments, the access request may include an action in the form of an API call, such as "create volume." In some embodiments, authentication module 1014 then proceeds to verify, or check the validity of the token ID. For example, authentication module 1014 can take a token key issued by Google and apply it in a function using the token ID to verify whether the token is valid. In some embodiments, verifying the token ID includes applying a mathematical hashing function to portions of the token ID, using the token key, and matching the result to a signature portion of the token ID.

In some embodiments, after verifying the token ID, authentication module 1014 proceeds by creating a user info object using the token ID. Further details regarding the user info object is described below with reference to FIG. 11A. In some embodiments, creating the user info object includes creating an empty user info object in memory. In some embodiments, authentication module 1014 then copies information in a claims section in the token into a claims section in the user info object. Next, in some embodiments, authentication module 1014 sets a username in the user info object according to a configuration set during booting of the system. In some embodiments, after the user info object is created, authentication module 1014 passes the user info object to authorization module 1016.

In some embodiments, security protocol 1010 also includes authorization module 1016 configured to determine whether an authenticated requestor is authorized to perform the action associated with the request. In some embodiments, authorization module 1018 makes this determination by checking whether the value in a "roles" field has access to the action requested in the access request.

In some embodiments, security protocol 1010 also includes permissions module 1018 configured to determine whether the requestor is an owner, collaborator, or member of a user group, as well as the access type if the requestor is a collaborator or member of a user group. If permissions module 1020 determines that the requestor does have permission, the access is granted. Otherwise, access is denied. In some embodiments, the difference between authorization module 1016 and permissions module 1018 is that authorization module 1016 checks whether the requestor is allowed to perform the action requested. By contrast, permissions module 1018 checks whether the requestor is allowed to perform the action on the particular volume. Thus, in some cases, the requestor may be allowed to perform the action (passes the authorization module), but not on the particular volume in question (fails the permissions module). In other words, in some embodiments, authentication module 1014 is concerned with the identity of the requestor, authorization module 1016 is concerned with the validity of the action requested, and permissions module 1018 is concerned with what can be done with the particular volume identified.

The techniques and mechanisms of the present disclosure provide an API level security protocol to allow users to securely access the control plane of a storage system without worrying that other users will delete or manipulate their data without permission. In this manner, existing functions and operations can easily be modified to include an ownership/permissions check in order integrate the security functions into existing storage systems. Thus, the techniques and mechanisms described herein can be easily integrated into standard computer and storage systems.

In some embodiments, the distributed system may be in a transitional state where new volumes are created with ownership object security, but old volumes that do not have ownership object security, still need to be accessed. In addition, in such embodiments, users may still not have received authentication token IDs, but still need access to volumes. In such embodiments, if a request without a token ID is received, authentication module 1014 would normally deny the request because the request is not authenticated. However, this prevents legitimate users, even though they do not have token IDs, from accessing their volumes. Thus, storage systems can address this problem by creating a "guest" role using a user info object.

Figure 11A:
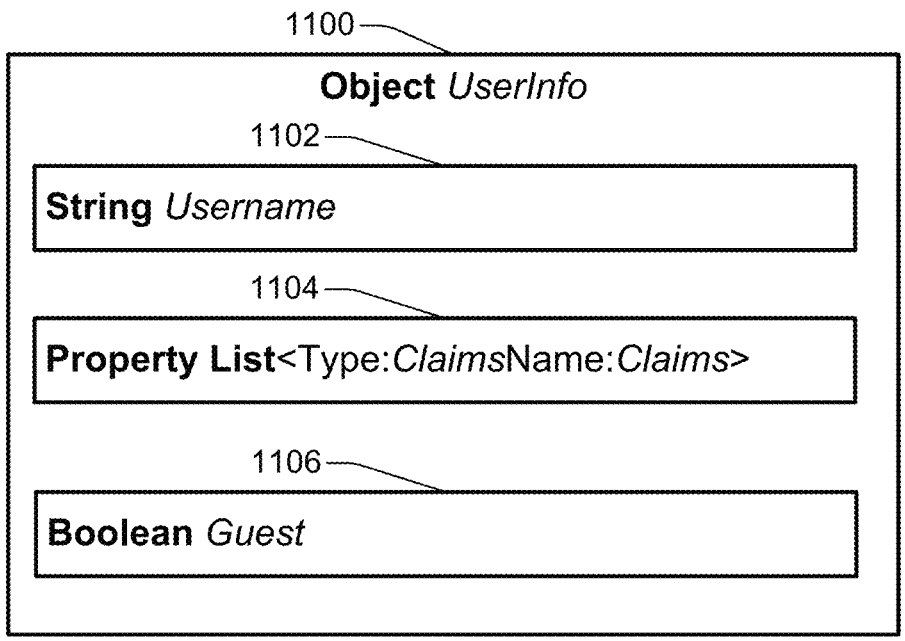
FIGS. 11A-11E illustrate examples of objects that can be used to implement the guest role, in accordance with embodiments of the present disclosure.

FIGS. 11A-11E illustrate examples of objects that can be used to implement the guest role, in accordance with embodiments of the present disclosure. FIG. 11A depicts an example user info object 1100. User info object 1100 includes a string Username 1102. As previously mentioned, in some embodiments, Username 102 is filled in with one of a name, email, or subject of a requestor as listed in the token ID. User info object 1100 also includes a structure 1104 and Boolean 1106. In some embodiments, Boolean 1106 is a guest Boolean that indicates whether the user has a guest role or not. In some embodiments, structure 1104 is a "claims" object. In such embodiments, the claims object is filled in with information retrieved from the claims section in a token, as described above.

Figure 11B:
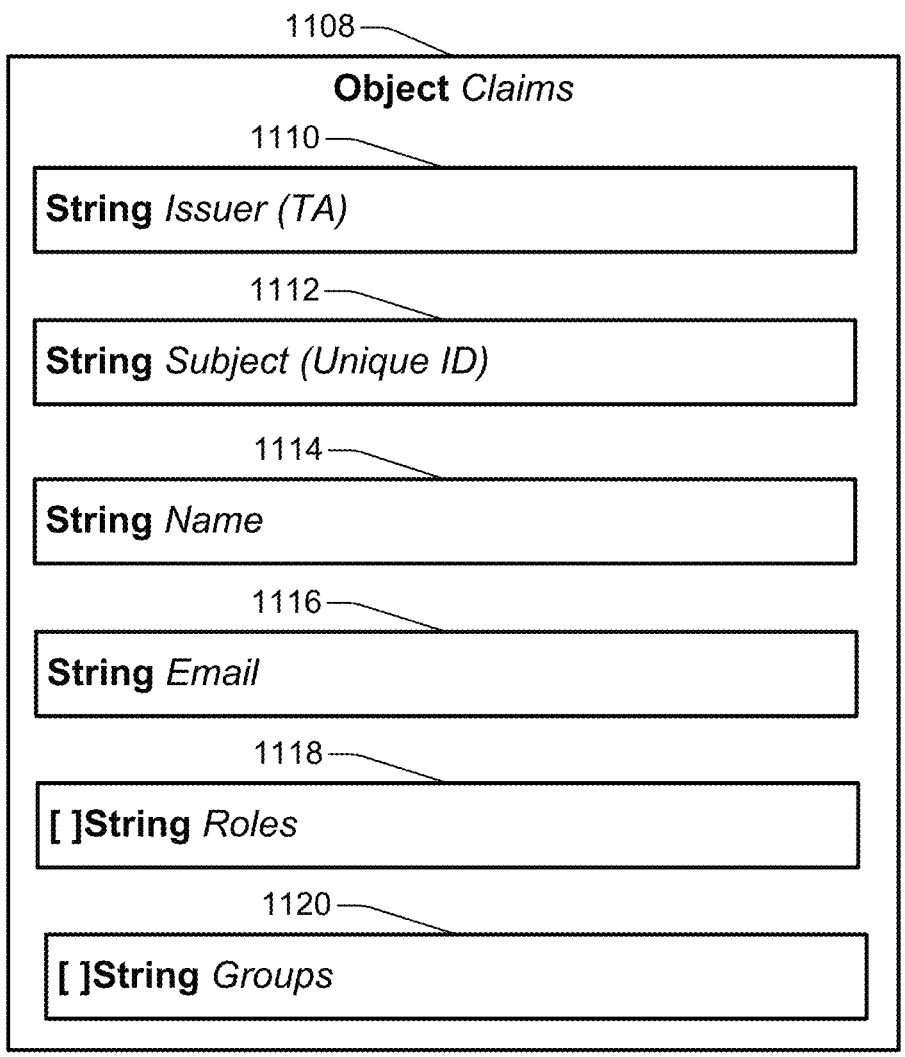

FIG. 11B illustrates an example of a claims object 1108. In some embodiments, claims object 1108 includes strings 1110, 1112, 1114, 1116, and string arrays 118 and 1120. In some embodiments, string 1110 denotes an issuer, or a token authority, such as Google.com. In some embodiments, string 1112 denotes a subject, or a unique ID, such as "727-5641." In some embodiments, string 1114 denotes a name, such as "John." In some embodiments, string 1116 denotes an email, such as john@gmail.com. In some embodiments, string array 1118 denotes any "roles" of the requestor, such as "user," "guest," or "admin." In some embodiments, string 1120 denotes any groups the requestor is in, such as "engineer," or "school."

Figure 11C:
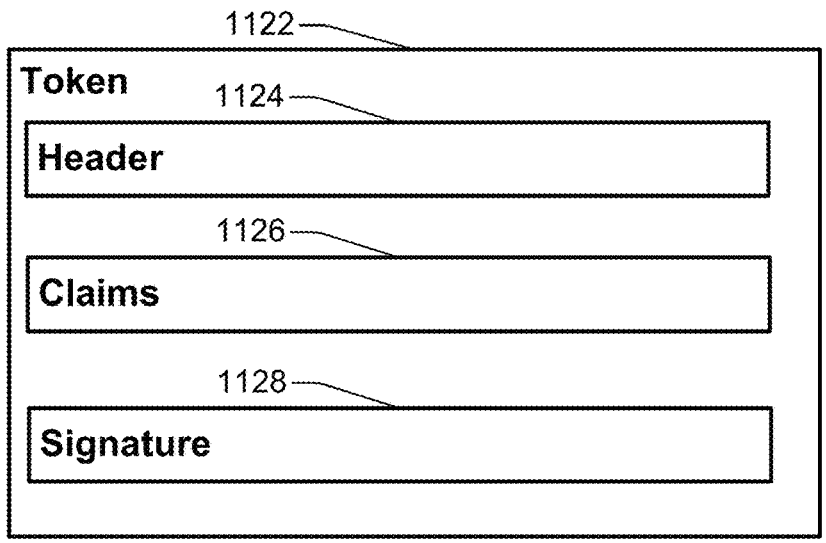

FIG. 11C illustrates a token ID 1122. Token 1122 includes a header 1124, claims 1126, and signature 1128. In some embodiments, claims 1126 includes information regarding the following: issuer (token authority), expiration date, issued at time (IAT) date, email, roles, groups, name, and subject (unique ID). In some embodiments, signature 1128 is a hash of the header plus the claims. In some embodiments, signature 1128 is used to verify the token ID.

Figure 11D:
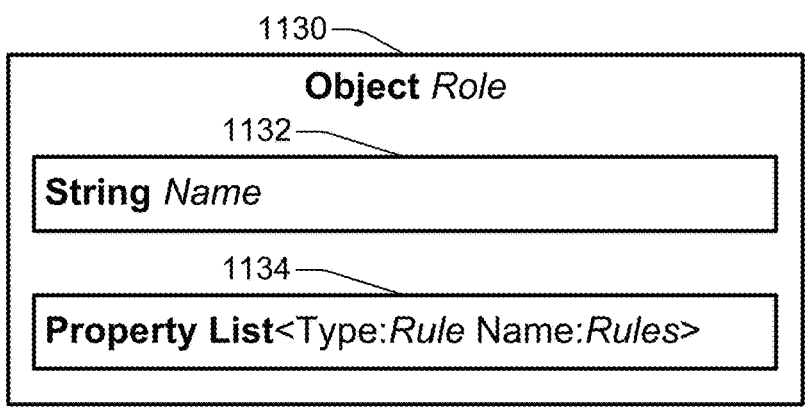
Figure 11E:
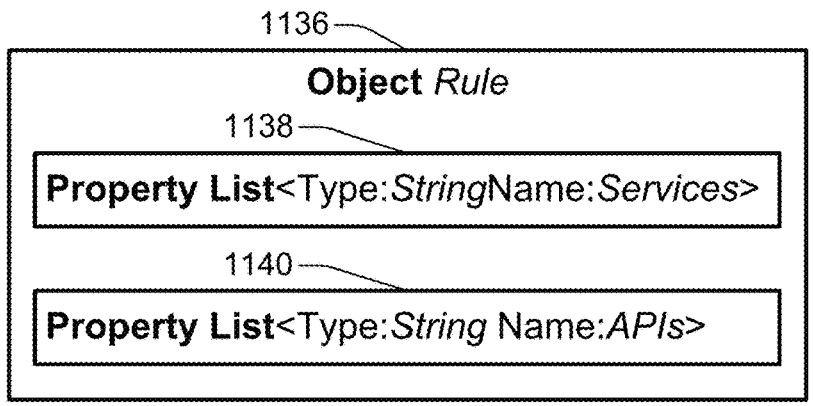

FIG. 11D depicts a role object 1110. Role object 1110 includes string name 1112 and property list 1114. In some embodiments, role object 11D is mapping of an identifier to a set of rules, or rule objects. FIG. 11E depicts a rule object 1120. Rule object 1120 includes property list 1122 and property list 1124. In some embodiments, rule object matches services 1138 to APIs 1140. For example, a rule object 1136 can match a service 1138, e.g., "volume," to an API, e.g., "create."

Figure 12:
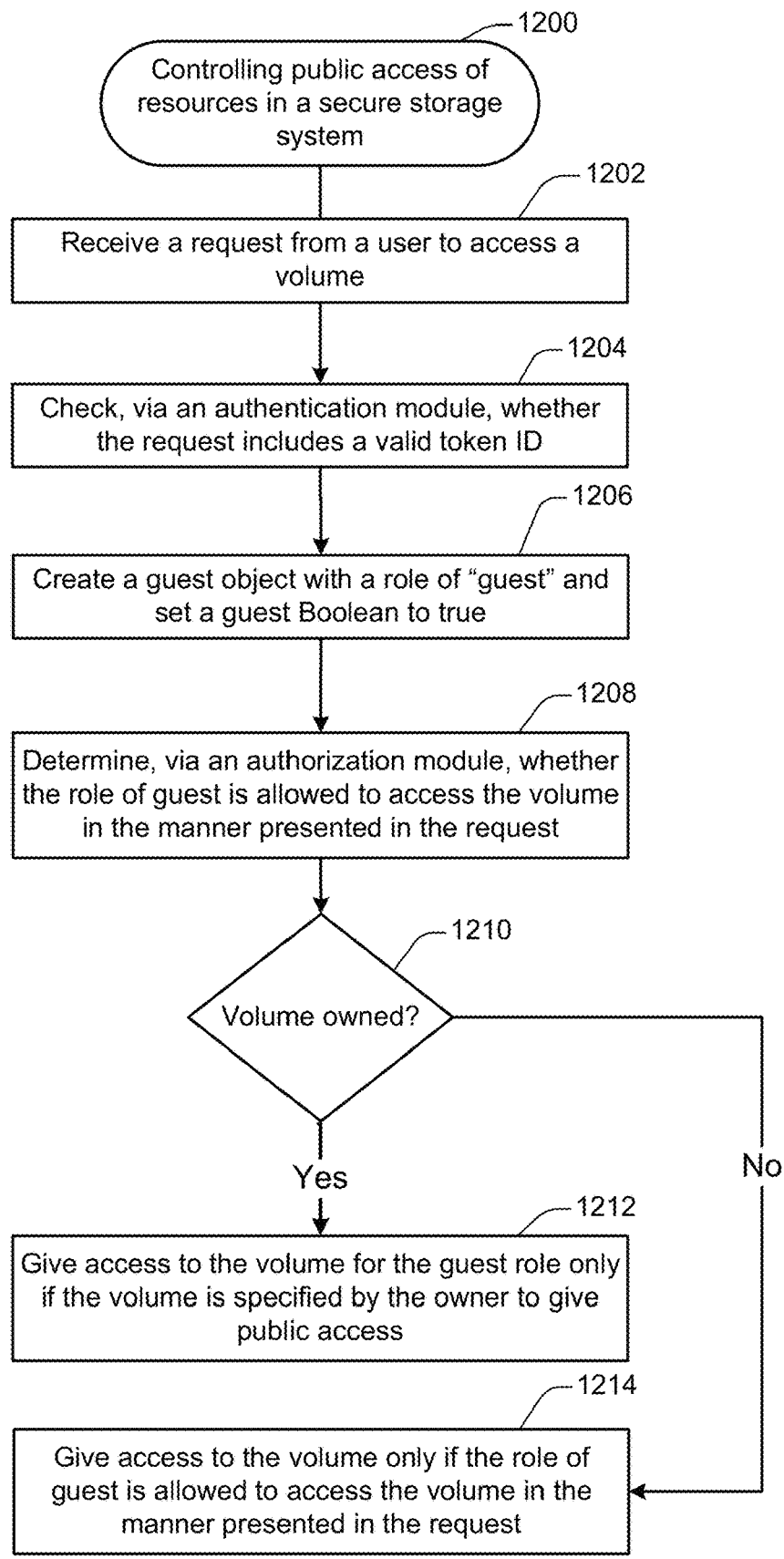
FIG. 12 illustrates a method of controlling public access of resources in a secure storage system, in accordance with embodiments of the present disclosure.

FIG. 12 illustrates a method 1200 of controlling public access of resources in a secure storage system, in accordance with embodiments of the present disclosure. At 1202, method 1200 begins with receiving a request from a user to access a volume. In some embodiments, the request includes an API call to access a volume. At 1204, authentication module 1014 checks whether the request includes a valid token ID. In some embodiments, if the request does include a valid token ID, then the method proceeds through the rest of the steps of method 900 starting from the authorization module in step 910. In some embodiments, if the request does not include a valid token ID, the user is considered anonymous.

At 1206, if the user is considered anonymous, then the system creates a guest role for the anonymous user. In some embodiments, the guest role is implemented via creating a user info object, such as user info object 1100, assigning the object a guest role, and setting a guest Boolean to true. In some embodiments, authentication module 1014 creates the user info object and assigns it to the anonymous user. In some embodiments, the guest role has the ability to create public volumes and access public volumes. In addition, in some embodiments, the guest role can also access any owned volumes that designate public access to the owned volumes. In some embodiments, the guest role is determined by the system.guest string. In some embodiments, other roles are system.user and system.admin. In some embodiments, the role of guest is mapped to a set of rules.

At 1208, authorization module 1016 determines whether the anonymous user, with the guest role, is allowed to access the volume in the manner presented in the request. In other words, the authorization module determines whether the action in the request is allowed. For example, if the request asks to reboot the system, which is not allowed for any user, the request would be denied.

At 1210, permissions module 1018 determines whether the volume in question is owned. If the volume is owned, then the system checks whether the volume has been given public access. In some embodiments, public access to a volume is determined by checking whether the public Boolean in the ownership object corresponding to the volume is set to true or false. If the volume has been given public access, permissions module 1018 checks to see what type of access is allowed to the public. Then, permissions module 1018 compares the access type with the action in the request. If the access type and the action, match, then access to the volume is given to the anonymous user at step 1212. For example, if the request is a "write," then access to a volume with only read public access would be denied.

If the volume is not owned, and is hence public, then access to the volume is given to the user. In some embodiments, if the volume is public, any user can access, mutate, or delete the volume. In some embodiments, the guest role is governed by a system.guest API. In some embodiments, there is a default set of actions allowed to the system.guest role. In some embodiments, the default set of actions includes volume creation, volume deletion, read, and write. However, in some embodiments, the administrator can modify the actions to include or remove separate actions. In some embodiments, the administrator can even disable the system.guest role entirely by removing all actions allowed to the guest role.

Creating the guest role for anonymous users allows a role based access control system to allow usage of public volumes. That way, an unsecure system can be switched to a secure system without shutting down the entire system and rebooting. Old users that do not yet have valid authentication tokens can still access their volumes because a guest role is created for them by the authentication module. This allows for seamless system integration of new features and protocols.

FIG. 13 illustrates one example of a computer system, in accordance with embodiments of the present disclosure. According to particular embodiments, a system 1300 suitable for implementing particular embodiments of the present disclosure includes a processor 1301, a memory 1303, an interface 1311, and a bus 1315 (e.g., a PCI bus or other interconnection fabric) and operates as a container node. When acting under the control of appropriate software or firmware, the processor 1301 is responsible for implementing applications such as an operating system kernel, a containerized storage driver, and one or more applications. Various specially configured devices can also be used in place of a processor 1301 or in addition to processor 1301. The interface 1311 is typically configured to send and receive data packets or data segments over a network.

Particular examples of interfaces supported include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control communications-intensive tasks such as packet switching, media control and management.

According to various embodiments, the system 1300 is a server configured to run a container engine. For example, the system 1300 may be configured as a storage container node as shown herein. The server may include one or more hardware elements as shown in FIG. 13. In some implementations, one or more of the server components may be virtualized. For example, a physical server may be configured in a localized or cloud environment. The physical server may implement one or more virtual server environments in which the container engine is executed. Although a particular server is described, it should be recognized that a variety of alternative configurations are possible. For example, the modules may be implemented on another device connected to the server.

In the foregoing specification, the disclosure has been described with reference to specific embodiments. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure.

What is claimed is:

1. A storage system comprising:
a processor; and
memory, the memory storing instructions executable to cause the processor to perform a method, the method comprising:
concurrently using, by the storage system during a transition state, two different security protocols to control access to resources of the storage system, the two different security protocols comprising:
a first security protocol that controls access to the resources of the storage system for a first set of access requests that include a token identifier; and
a second security protocol that controls access to the resources of the storage system for a second set of access requests that do not include a token identifier.

2. The storage system of claim 1, wherein the second security protocol uses a guest role to control access to the resources of the storage system for the second set of access requests that do not include a token identifier.

3. The storage system of claim 2, wherein using the guest role to control access to the resources comprises creating a user object with the guest role.

4. The storage system of claim 3, wherein using the guest role to control access to the resources further comprises setting a guest Boolean to true.

5. The storage system of claim 2, wherein using the guest role to control access to the resources comprises determining, for an access request, that the guest role is allowed to access a requested resource in a manner presented in the access request.

6. The storage system of claim 5, wherein using the guest role to control access to the resources further comprises determining, in response to determining that the guest role is allowed to access the requested resource, whether the requested resource is owned or public.

7. The storage system of claim 6, wherein using the guest role to control access to the resources further comprises:
in response to determining that the requested resource is owned, giving access to the requested resource for the guest role only when the requested resource is specified to give public access, otherwise denying the access request.

8. The storage system of claim 6, wherein using the guest role to control access to the resources further comprises:
in response to determining that the requested resource is public, giving access to the requested resource only when the guest role is allowed to access the requested resource in the manner presented in the access request, otherwise denying the access request.

9. A method comprising:
concurrently using, by a storage system during a transition state, two different security protocols to control access to resources of the storage system, the two different security protocols comprising:
a first security protocol that controls access to the resources of the storage system for access requests that include a token identifier; and
a second security protocol that controls access to the resources of the storage system for access requests that do not include a token identifier.

10. The method of claim 9, wherein the second security protocol uses a guest role to control access to the resources of the storage system for the access requests that do not include a token identifier.

11. The method of claim 10, wherein using the guest role to control access to the resources comprises:
creating a user object with the guest role; and
setting a guest Boolean to true.

12. The method of claim 10, wherein using the guest role to control access to the resources comprises:
determining, for an access request that does not include a token identifier, that the guest role is allowed to access a requested resource in a manner presented in the access request;
determining, in response to determining that the guest role is allowed to access the requested resource, that the requested resource is public;
and
in response to determining that the requested resource is public, giving access to the requested resource.

13. A method comprising:
concurrently allowing, by a storage system, use of two different security protocols to control access to resources of the storage system, the two different security protocols comprising:
a first security protocol of a gatekeeper to the storage system that controls access to the resources of the storage system by way of the gatekeeper to the storage system; and
a second security protocol that controls access to the resources of the storage system by way of a control plane of the storage system.

14. The method of claim 13, further comprising:
receiving, by way of the control plane of the storage system, a request to access a resource of the storage system; and
authenticating, based on the second security protocol, a user associated with the request.

15. The method of claim 14, wherein:
the request includes a token identifier; and
authenticating the user associated with the request comprises verifying a validity of the token identifier.

16. The method of claim 15, further comprising:
creating a user information object using the token identifier; and
copying information from a token associated with the token identifier to the user information object.

17. The method of claim 14, further comprising:
determining whether the user associated with the request is authorized to perform an action indicated by the request.

18. The method of claim 17, further comprising:
determining whether the user associated with the request is authorized to perform the action on the resource to which access is requested.

19. The method of claim 13, wherein the second security protocol comprises an application program interview (API) level security protocol of the control plane of the storage system.

20. The method of claim 13, wherein the gatekeeper comprises a container orchestrator.

* * * * *